US009603088B2

(12) United States Patent
Seok

(10) Patent No.: US 9,603,088 B2
(45) Date of Patent: *Mar. 21, 2017

(54) METHOD FOR TRANSMITTING AND RECEIVING FRAME PERFORMED BY STATION OPERATING IN POWER SAVE MODE IN WIRELESS LOCAL AREA NETWORK SYSTEM AND APPARATUS FOR THE SAME

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,554

(22) Filed: Dec. 22, 2014

(65) Prior Publication Data

US 2015/0103722 A1   Apr. 16, 2015

Related U.S. Application Data

(63) Continuation of application No. 13/879,729, filed as application No. PCT/KR2012/009058 on Oct. 31, 2012, now Pat. No. 8,964,618.

(60) Provisional application No. 61/594,378, filed on Feb. 3, 2012.

(51) Int. Cl.
*H04W 52/02* (2009.01)
*H04W 74/06* (2009.01)

(52) U.S. Cl.
CPC ... *H04W 52/0206* (2013.01); *H04W 52/0216* (2013.01); *H04W 74/06* (2013.01); *Y02B 60/50* (2013.01)

(58) Field of Classification Search
CPC ....... H04W 74/06; H04L 5/0041; Y02B 60/50
See application file for complete search history.

(56) References Cited

U.S. PATENT DOCUMENTS

| 8,842,614 B2 | 9/2014 | Liu et al. |
| 2005/0213534 A1 | 9/2005 | Benveniste |
| 2005/0286454 A1 | 12/2005 | Morimoto et al. |
| 2005/0288070 A1 | 12/2005 | Omori et al. |
| 2007/0037548 A1 | 2/2007 | Sammour et al. |
| 2007/0147330 A1 | 6/2007 | Smith et al. |

(Continued)

FOREIGN PATENT DOCUMENTS

| CN | 1716894 A | 1/2006 |
| CN | 1716895 A | 1/2006 |

(Continued)

*Primary Examiner* — David Oveissi
(74) *Attorney, Agent, or Firm* — Birch, Stewart, Kolasch & Birch, LLP

(57) ABSTRACT

A method for a wireless local area network. The method according to one embodiment is performed by an access point and includes receiving a power save (PS) poll on a first 20 MHz channel from a station operating in a power save mode; receiving at least one duplicated PS poll frame on at least one second 20 MHz channel from the station, the at least one duplicated PS poll frame including at least one duplicate of the PS poll frame; and transmitting a buffered frame to the station as a response to at least one of the PS poll frame and the at least one duplicated PS poll frame.

10 Claims, 22 Drawing Sheets

(56) References Cited

U.S. PATENT DOCUMENTS

| | | |
|---|---|---|
| 2007/0230423 A1 | 10/2007 | Yoshida et al. |
| 2007/0297351 A1* | 12/2007 | Trainin ................. H04L 12/66 370/260 |
| 2009/0252135 A1 | 10/2009 | Benveniste |
| 2010/0067423 A1 | 3/2010 | Sun et al. |
| 2010/0121933 A1* | 5/2010 | Booton ............. H04M 3/42323 709/207 |
| 2010/0142426 A1 | 6/2010 | Taniuchi et al. |
| 2011/0103319 A1* | 5/2011 | Abraham .......... H04W 72/1289 370/329 |
| 2011/0128900 A1 | 6/2011 | Seok |
| 2013/0136066 A1 | 5/2013 | Kim et al. |

FOREIGN PATENT DOCUMENTS

| | | |
|---|---|---|
| JP | 2005-287040 A | 10/2005 |
| JP | 2010-130096 A | 6/2010 |
| KR | 10-2004-0065518 A | 7/2004 |

* cited by examiner

METHOD FOR TRANSMITTING AND RECEIVING FRAME PERFORMED BY STATION OPERATING IN POWER SAVE MODE IN WIRELESS LOCAL AREA NETWORK SYSTEM AND APPARATUS FOR THE SAME

CROSS-REFERENCE TO RELATED APPLICATIONS

This application is a continuation of co-pending U.S. patent application Ser. No. 13/879,729 filed on Apr. 16, 2013, which is the national phase of PCT International Application No. PCT/KR2012/009058 filed on Oct. 31, 2012, and which claims priority to U.S. Provisional Application No. 61/594,378 filed on Feb. 3, 2012. The entire contents of all of the above applications are hereby incorporated by reference.

BACKGROUND OF THE INVENTION

Field of the Invention

The present invention relates to a wireless local area network system, and more particularly, to a method for transmitting and receiving frames performed by a station operating in a power save mode in a wireless local area network system and an apparatus for the same.

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

In a WLAN system, a station (STA) supports a power save mode. The STA enters a doze state to operate so that it is possible to prevent power from being unnecessarily used. When traffic related to data to be transmitted to the STA that is operating in the doze state exists, an access point (AP) may indicate the traffic to the STA. The STA may recognize that the traffic related to the data to be transmitted thereto exists and may request the AP to transmit the traffic. The AP may transmit a frame in response to the request of the STA.

Meanwhile, in a multi channel environment where data is exchanged through a plurality of channels, signaling for channels used for the AP transmitting the frame to the STA may be required. Therefore, an efficient method of transmitting and receiving a frame for the STA that operates in the power save mode in the multi channel environment is required.

SUMMARY OF THE INVENTION

An object of the present invention is to provide a method for transmitting and receiving frames performed by a station (STA) operating in a power save mode in a wireless local area network (WLAN) system and an apparatus for the same.

In an aspect, a method for transmitting and receiving frames performed by a station (STA) in power save mode in a wireless local area network is provided. The method includes: transmitting a Power Save (PS) poll frame to an access point (AP) in a first 20 MHz channel; transmitting at least one duplicated PS poll frame to the AP in at least one second 20 MHz channel, the at least one duplicated PS poll frame being generated by duplicating the PS poll frame; and receiving a bufferable frame from the AP as a response of at least one of the PS poll frame and the at least one duplicated PS poll frame.

The PS poll frame and the at least one duplicate PS poll frame may respectively include a data field. The data field may be scrambled based on a specific scrambling sequence. The data field may include a transmitter address (TA) field set to a bandwidth signaling TA. The bandwidth signaling TA may indicate an address of the STA, and the specific scrambling sequence may include first bandwidth information.

The first bandwidth information may indicate a bandwidth for the PS poll frame and the at least one duplicated PS poll frame.

The PS poll frame and the at least one duplicated PS poll frame may further respectively include a VHT-SIG-A field including a bandwidth field. The VHT-SIG-A field may be generated based on second bandwidth information. The second bandwidth information may be same as the first bandwidth information.

The method may further include receiving an acknowledgement (ACK) frame from the AP for acknowledging the PS poll frame and the at least one duplicated PS poll frame.

The ACK frame may include a receiver address (RA) field. The RA field may be set to a non-bandwidth signaling TA obtained in basis of the TA field in at least one of the PS poll frame and the at least one duplicated PS poll frame. The non-bandwidth signaling TA may indicate the address of the STA, and include a individual/group bit set to '0'.

The number of the at least one secondary 20 MHz channel may be one, and the first 20 Mhz channel may be contiguous with the secondary 20 MHz channel.

The number of the at least one secondary 201 MHz channel may be three, and the first 20 MHz channel may be contiguous with the contiguous three secondary 20 MHz channels.

The number of the at least one secondary 20 MHz channel may be seven, and the first 20 MHz channel may be contiguous with the contiguous seven secondary 20 MHz channels.

The number of the at least one secondary 20 MHz may be seven, the first 20 MHz channel may be contiguous with three 20 MHz secondary channels among the seven secondary 20 MHz channels, and the first 20 MHz channel and the three 20 MHz secondary channels may be not contiguous with the remaining four secondary 20 MHz channels.

The method may further include receiving a Traffic Indication Map (TIM) element from the AP; and determining whether the bufferable frame is buffered for the STA based on the TIM element. If it is determined that the bufferable frame is buffered, the PS poll frame and the at least one PS poll frame may be transmitted.

In another aspect, a wireless apparatus operating in a wireless local area network system is provided. The wireless apparatus includes a transceiver transmitting and receiving radio signals; and a processor operably coupled to the transceiver. The processor is configured to: transmit a Power Save (PS) poll frame to an access point (AP) in a first 20 MHz channel, transmit at least one duplicated PS poll frame to the AP in at least one second 20 MHz channel, the at least one duplicated PS poll frame being generated by duplicating the PS poll frame, and receive a bufferable frame from the AP as a response of at least one of the PS poll frame and the at least one duplicated PS poll frame.

In a multichannel wireless local area network (LAN) system, a station (STA) may request to transmit a buffered frame by transmitting a power save (PS)-poll frame by a duplicate format and may signal a bandwidth for transmitting the buffered frame. Therefore, an access point (AP) may transmit the buffered frame to the STA based on information on the bandwidth signaled by the PS-poll frame. An STA that operates in a power save mode in a multi channel environment may exchange a frame with an AP through multi channel so that the throughput of the entire system may be improved.

The STA that operates in the power save mode may transmit the SP-poll frame to the AP to request the AP to transmit the buffered frame and may initiate a polled service period for the above. The STA may receive at least one buffered frame from the AP in the initiated polled service period. Since the STA may receive at least one frame by obtaining a channel access authority, the processing speed of the buffered traffic may be improved. Therefore, the throughput of the entire system may be improved.

DETAILED DESCRIPTION OF THE INVENTION

Figure 1:
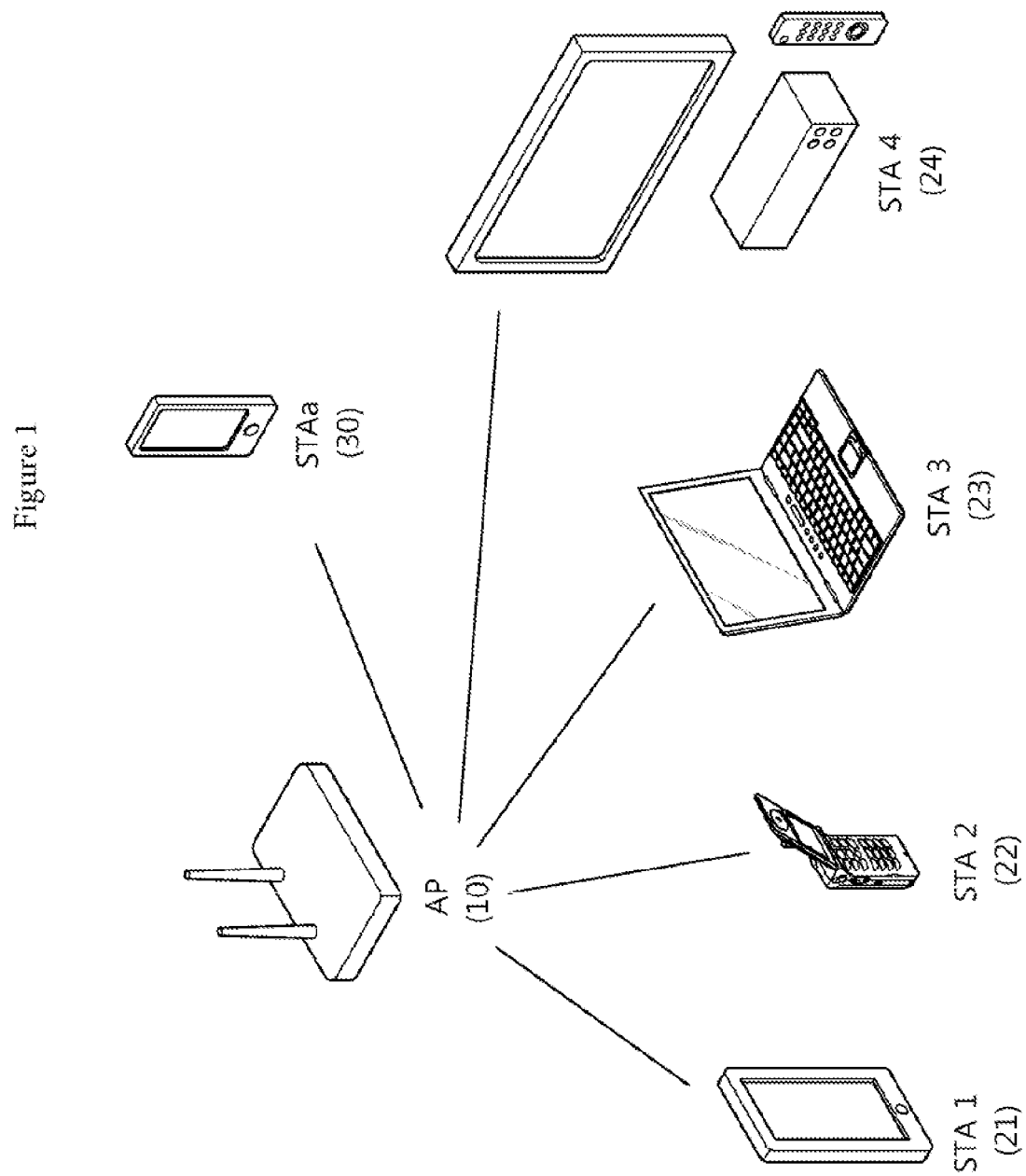
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1 21, STA2 22, STA3 23, STA4 24, and STAa 30, an AP (Access Point) 10 providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning. Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

Further to a conventional WLAN system that supports 20 MHz and 40 MHz, in a VHT WLAN system, transmission of bandwidth of 80 MHz, contiguous 160 MHz, and non-contiguous 160 MHz and/or transmission of bandwidth of no less than 160 MHz is to be supported. Further to the conventional wireless LAN system that supports up to 64 quadrature amplitude modulation (QAM), the VHT wireless LAN system supports 256QAM.

Since a multiuser-multiple input multiple output (MU-MIMO) transmitting method is supported in the VHT wireless LAN system for higher throughput, an AP may simultaneously transmit a data frame to at least one MIMO paired STA. The maximum number of paired STAs may be 4. When the maximum number of spatial streams is 8, up to 4 spatial streams may be allotted to the STAs.

Referring back to FIG. 1, in a WLAN system, such as that shown in FIG. 1, an AP 10 can transmit data to an STA group, including at least one of a plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

Data transmitted to the STAs may be transmitted through different spatial streams. A data packet transmitted by the AP 10 as a physical layer convergence procedure (PLCP) protocol data unit (PPDU) generated by a physical layer of the wireless LAN system to be transmitted or a data field included in the PPDU may be referred to as a frame. That is, a PPDU for single user (SU)-MIMO and/or MU-MIMO or the data field included in the PPDU may be referred to as an MIMO packet. A PPDU for MU may be referred to as an MU packet. In an example of the present invention, it is assumed that a group of STAs MU-MIMO paired with the AP 10 to be transmitted includes an STA1 21, an STA2 22, an STA3 23, and an STA4 24. At this time, spatial streams are not allotted to a specific STA of the group of STAs to be transmitted so that data may not be transmitted. On the other hand, it is assumed that an STAa 30 is combined with the AP, however, is not included in the group of STAs to be transmitted.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
|---|---|
| 1 | Category |
| 2 | VHT action |
| 3 | Membership status |
| 4 | Spatial stream position |

The category field and the VHT action field are set to identify that the frame corresponds to a management frame and a group ID management frame used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AP. Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

On the other hand, a TV white space (WS) is spotlighted as a frequency band that may be newly used in the wireless LAN system. The TV WS refers to a frequency band in an idle state that is left due to digitalization of analog TVs of the United States, for example, 54-698 MHz band. However, the above is only an example. The TV WS may be referred to as a licensed band that may be priorly used by a licensed user. The licensed user means a user licensed to use the licensed band and may be referred to as a licensed device, a primary user, and an incumbent user.

The AP and/or the STA that operates in the TV WS must provide a function of protecting the licensed user, which is because the licensed user priorly uses the TV WS band. For example, when a specific WS channel that is a frequency band divided to have specific bandwidth in the TV WS by regulation is previously used by the licensed user such as a microphone, in order to protect the licensed user, the AP and/or the STA may not use the frequency band corresponding to the corresponding WS channel. In addition, when the frequency band that is currently used for transmitting and/or receiving a frame is used by the licensed user, the AP and/or the STA must stop using the corresponding frequency band.

Therefore, a procedure of the AP and/or the STA determining whether the specific frequency band in the TV WS band may be used, that is, whether the licensed user exists in the frequency band must be preceded. Determining whether the licensed user exists in the specific frequency band is referred to as spectrum sensing. An energy detection method and a signature detection method are used as a spectrum sensing mechanism. It may be determined that the licensed user is using the frequency band when the intensity of a received signal is no less than a predetermined value or when a digital TV (DTV) preamble is detected.

Figure 2:
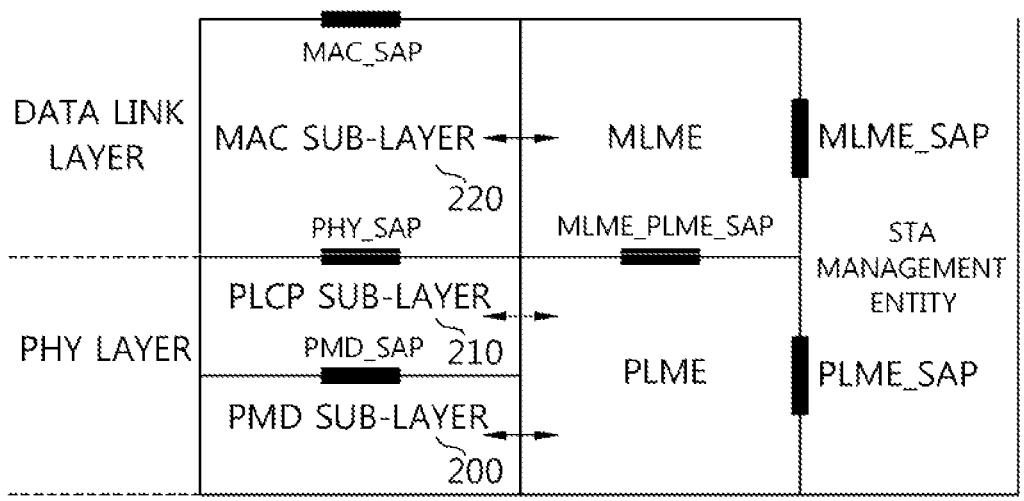
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIGS. 3 to 5.

The PLCP sub-layer 210 generates a PPDU by attaching the aforementioned field to the PSDU and transmits the generated PPDU to a reception STA via the PMD sub-layer.

The reception STA receives the PPDU, acquires information required for data recovery from the PLCP preamble and the PLCP header, and recovers the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Figure 3:
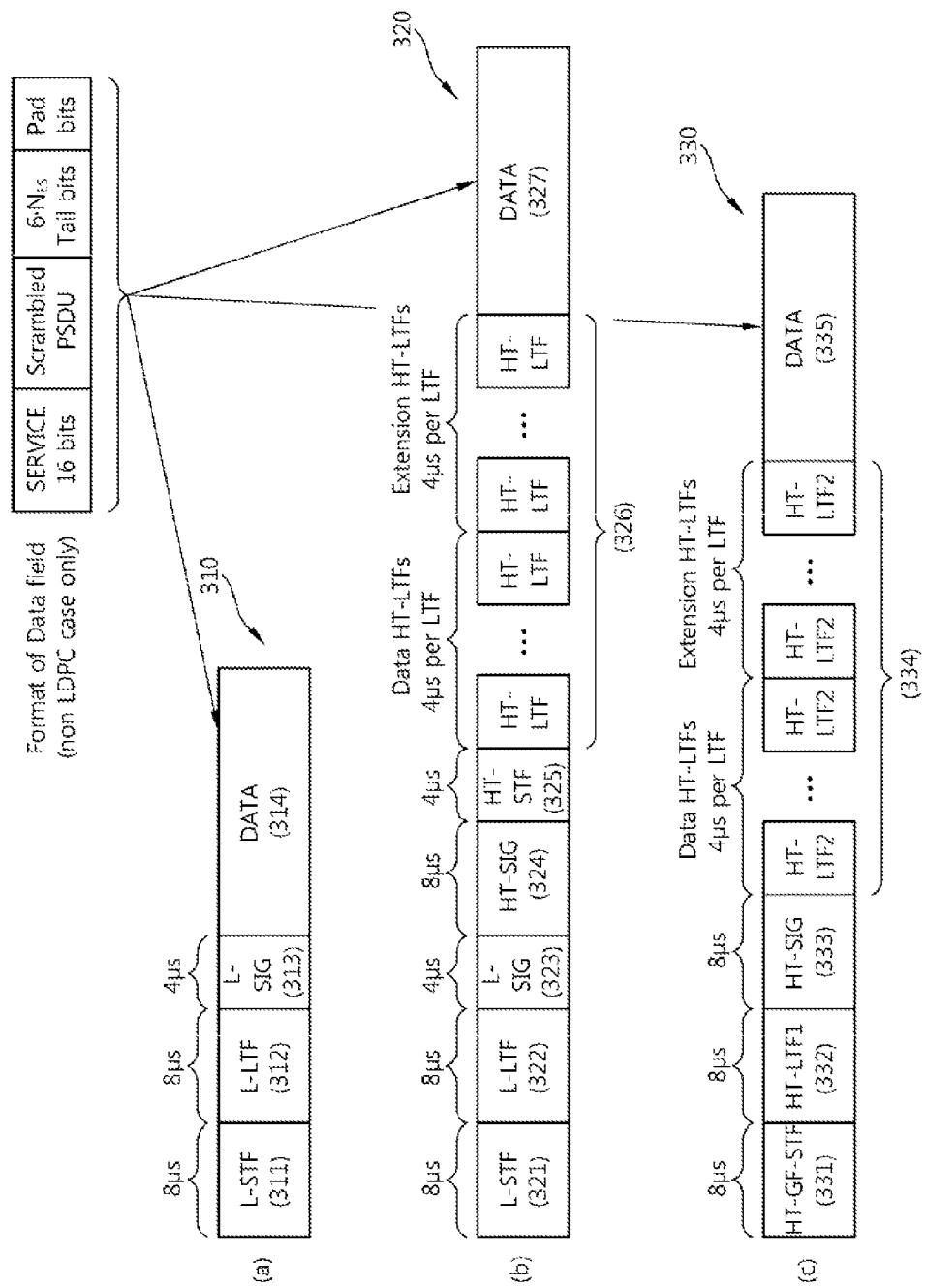
FIG. 3 is a block diagram illustrating the format of the PPDU used in the wireless LAN system according to an embodiment of the present invention.

FIG. 3 is a block diagram illustrating the format of the PPDU used in the wireless LAN system according to an embodiment of the present invention. Hereinafter, an STA that operates in a legacy wireless LAN system based on IEEE 802.11a/b/g that is an existing wireless LAN standard prior to IEEE 802.11n is referred to as a legacy STA (L-STA). In addition, an STA that may support high throughput (HT) in an HT wireless LAN system based on the IEEE 802.11n is referred to as an HT-STA.

FIG. 3(a) illustrates the format of a legacy PPDU (L-PPDU) that is used in the IEEE 802.11a/b/g that is the existing wireless LAN system standard prior to the IEEE 802.11n. Therefore, in the HT wireless LAN system to which the IEEE 802.11n standard is applied, the L-STA may transmit and receive the L-PPDU having the above format.

Referring to FIG. 3(a), an L-PPDU 310 includes an L-STF 411, an L-LTF 312, an L-SIG field 313, and a data field 314.

The L-STF 311 is used for frame timing acquisition, automatic gain control (AGC) convergence, coarse frequency acquisition, etc.

The L-LTF 312 is used for frequency offset and channel estimation.

The L-SIG field 313 includes control information for demodulation and decoding of the data field 314.

The L-PPDU may be transmitted in the order of the L-STF 311, the L-LTF 312, the L-SIG field 313, and the data field 314.

FIG. 3(b) is a diagram showing an HT-mixed PPDU format in which an L-STA and an HT-STA can coexist. An HT-mixed PPDU 320 includes an L-STF 321, an L-LTF 322, an L-SIG field 323, an HT-SIG field 324, an HT-STF 325, a plurality of HT-LTF 326, and a data field 327.

The L-STF 321, the L-LTF 322, and the L-SIG field 323 are identical to those shown in FIG. 3(a). Therefore, the L-STA can interpret the data field by using the L-STF 321, the L-LTF 322, and the L-SIG field 323 even if the HT-mixed PPDU 320 is received. The L-LTF 322 may further include information for channel estimation to be performed by the i-STA in order to receive the HT-mixed PPDU 320 and to interpret the L-SIG field 323, the HT-SIG field 324, and the HT-STF 325.

The HT-STA can know that the HT-mixed PPDU 320 is a PPDU dedicated to the HT-STA by using the HT-SIG field 324 located next to the L-SIG field 323, and thus can demodulate and decode the data field 327.

The HT-STF 325 may be used for frame timing synchronization, AGC convergence, etc., for the IT-STA.

The HT-LTF 326 may be used for channel estimation for demodulation of the data field 327. Since the IEEE 802.11n supports single user-MIMO (SU-MIMO), a plurality of the HT-LTF 326 may be configured for channel estimation for each of data fields transmitted through a plurality of spatial streams.

The HT-LTF 326 may consist of a data HT-LTF used for channel estimation for a spatial stream and an extension HT-LTF additionally used for full channel sounding. Therefore, the number of the plurality of HT-LTF 326 may be equal to or greater than the number of spatial streams to be transmitted.

The L-STF 321, the L-LTF 322, and the L-SIG field 323 are transmitted first so that the L-STA also can acquire data by receiving the HT-mixed PPDU 320. Thereafter, the HT-SIG field 324 is transmitted for demodulation and decoding of data transmitted for the HT-STA.

Up to fields located before the HT-SIG field 324, transmission is performed without beamforming so that the L-STA and the HT-STA can acquire data by receiving a corresponding PPDU. In the subsequently fields, i.e., the HT-STF 325, the HT-LTF 326, and the data field 327, radio signal transmission is performed by using precoding. In this case, the HT-STF 325 is transmitted so that an STA that receives a precoded signal can consider a varying part caused by the precoding, and thereafter the plurality of HT-LTF 326 and the data field 327 are transmitted.

Even if an IT-STA that uses 20 MHz in an HT WLAN system uses 52 data subcarriers per OFDM symbol, an L-STA that also uses 20 MHz uses 48 data subcarriers per OFDM symbol. Since the HT-SIG field 324 is decoded by using the L-LTF 322 in a format of the HT-mixed PPDU 320 to support backward compatibility, the HT-SIG field 324 consists of 48×2 data subcarriers. The HT-STF 325 and the HT-LTF 326 consist of 52 data subcarriers per OFDM symbol. As a result, the HT-SIG field 324 is supported using ½ binary phase shift keying (BPSK), each HT-SIG field 424 consists of 24 bits, and thus 48 bits are transmitted in total. That is, channel estimation for the L-SIG field 323 and the HT-SIG field 324 is performed using the L-LTF 322, and a bit sequence constituting the L-LTF 322 can be expressed by Equation 1 below. The L-LTF 322 consists of 48 data subcarriers per one symbol, except for a DC subcarrier.

$$L_{-26,26}=\{1,1,-1,-1,1,1,-1,1,-1,1,1,1,1,1,1,-1,-1,1,$$
$$1,-1,1,-1,1,1,1,1,0,1,-1,-1,1,1,-1,1,-1,-1,-1,-$$
$$1,-1,1,1,-1,-1,1,-1,1,-1,1,1,1,1,1,\}$$ [Math Figure 1]

FIG. 3(c) is a diagram showing a format of an HT-Greenfield PPDU 330 that can be used by only an HT-STA. The HT-GF PPDU 330 includes an HT-GF-STF 331, an HT-LTF1 332, an HT-SIG field 333, a plurality of HT-LTF2 334, and a data field 335.

The HT-GF-STF 331 is used for frame timing acquisition and AGC.

The HT-LTF1 332 is used for channel estimation.

The HT-SIG field 333 is used for demodulation and decoding of the data field 335.

The HT-LTF2 334 is used for channel estimation for demodulation of the data field 335. Since the HT-STA uses SU-MIMO, channel estimation is required for each of data fields transmitted through a plurality of spatial streams, and thus a plurality of HT-LTF2 334 may be configured.

The plurality of HT-LTF2 334 may consist of a plurality of data HT-LTFs and a plurality of extension HT-LTFs, similarly to the HT-LTF 326 of the HT-mixed PPDU 320. Data fields 314, 327, and 335 illustrated in FIG. (a), (b), and (c) may include a service field, a scrambled PLCP service data unit (PSDU), a tail bit, and a padding bit, respectively. The service field may be used for initializing a scrambler. The service field may be configured by 16 bits. In this case, bits for initializing the scrambler may be realized by 7 bits. The tail field may be configured by a bit sequence required for returning a convolution encoder to a zero state. A bit size proportional to the number of binary convolutional code (BCC) encoders used for encoding data to be transmitted may be allotted to the tail field. In detail, the tail field may be realized to have 6 bits by the number of BCCs.

Figure 4:
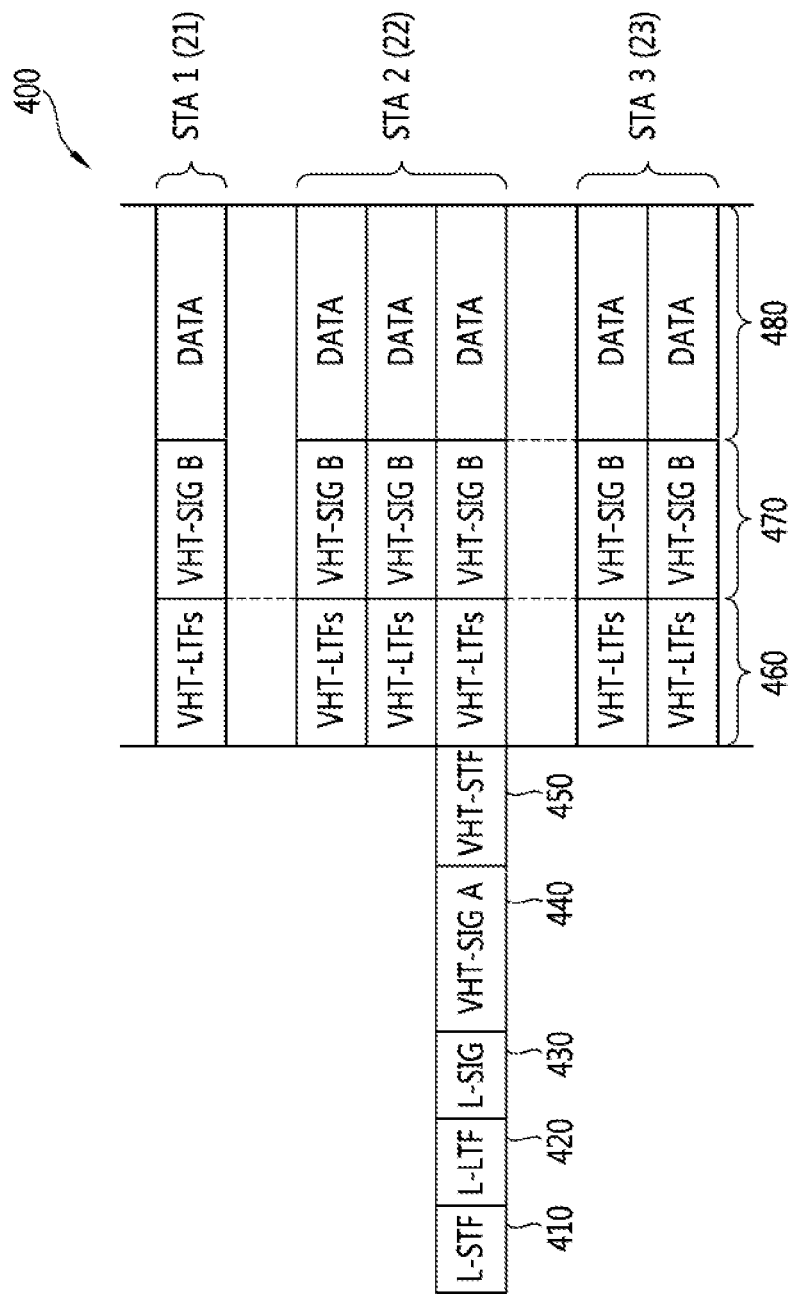
FIG. 4 shows an example of a PPDU format used in the WLAN system supporting very high throughput (VHT) according to the embodiment of the present invention.

FIG. 4 shows an example of a PPDU format used in the WLAN system supporting very high throughput (VHT) according to the embodiment of the present invention.

Referring to FIG. 4, a PPDU 400 includes an L-STF 410, an L-LTF 420, an L-SIG field 430, a VHT-SIGA field 440, a VHT-STF 450, a VHT-LTF 460, a VHT-SIGB field 470, and a data field 480.

A PLCP sub-layer constituting a PHY converts a PSDU delivered from a MAC layer into the data field 480 by appending necessary information to the PSDU, generates the PPDU 400 by appending several fields such as the L-STF 410, the L-LTF 420, the L-SIG field 430, the VHT-SIGA field 440, the VHT-STF 450, the VHT-LTF 460, the VHT-SIGB field 470, or the like, to the data field and delivers the PPDU 400 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 410 is used for frame timing acquisition, automatic gain control (AGC) convergence, coarse frequency acquisition, etc.

The L-LTF 420 is used for channel estimation for demodulation of the L-SIG field 430 and the VHT-SIGA field 440.

The L-SIG field 430 is used when the L-STA receives the PPDU 400 and interprets it to acquire data. The L-SIG field 430 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 430 includes information related to the transmission time.

The VHT-SIGA field 440 includes control information (or signal information) required by STAs for receiving the PPDU to interpret the PPDU 400. The VHT-SIGA 440 is transmitted on two OFDM symbols. Accordingly, the VHT-SIGA field 440 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 400.

When the group ID indicates that the PPDU 400 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 400 is transmitted using the MU-MIMO transmission scheme, the VHT-SIGA field 400 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 470.

The VHT-STF 450 is used to improve performance of AGC estimation in MIMO transmission.

The VHT-LTF 460 is used when the STA estimates a MIMO channel. Since the next generation WLAN system supports MU-MIMO, the VHT-LTF 460 can be configured by the number of spatial streams in which the PPDU 400 is transmitted. In addition, when full channel sounding is supported and is performed, the number of VHT-LTFs may increase.

The VHT-SIGB field 470 includes dedicated control information required when the plurality of MIMO-paired STAs receive the PPDU 400 to acquire data. Therefore, the STA may be designed such that the VHT-SIGB field 470 is decoded only when the control information included in the VHT-SIGA field 440 indicates that the currently received PPDU 400 is transmitted using MU-MIMO transmission. On the contrary, the STA may be designed such that the VHT-SIGB field 470 is not decoded when the control information in the VHT-SIGA field 440 indicates that the currently received PPDU 400 is for a single STA (including SU-MIMO).

The VHT-SIGB field 470 may include MCS information and rate-matching information for each STA. Further, the VHT-SIGB field 470 may include information indicating a PSDU length included in the data field for each STA. The information indicating the PSDU length is information indicating a length of a bit-sequence of the PSDU and can be indicated in the unit of octet. Meanwhile, when the PPDU is transmitted based on single user transmission, the information about the MCS may not be included in the VHT-SIGB field 470, because that is included in the VHT-SIGA field 440. A size of the VHT-SIGB field 470 may differ according to the MIMO transmission method (MU-MIMO or SU-MIMO) and a channel bandwidth used for PPDU transmission.

The data field 480 includes data intended to be transmitted to the STA. The data field 480 includes a PLCP service data unit (PSDU) to which a MAC protocol data unit (MPDU) of a MAC layer is delivered, a service field for initializing a scrambler, a tail field including a bit sequence required to reset a convolution encoder to a zero state, and padding bits for normalizing a length of the data field. In case of MU transmission, each data unit intended to be respectively transmitted to each STA may be included in the data field 580. The data unit may be aggregate MPDU (A-MPDU).

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 4, no spatial stream may be allocated to the STA4 24, and a specific number of spatial streams may be allocated to each of the STA1 21, the STA2 22, and the STA3 23 and thus data can be transmitted. In the example of FIG. 4, one spatial stream is allocated to the STA1 21, three spatial streams are allocated to the STA2 22, and two spatial streams are allocated to the STA3 23.

Figure 5:
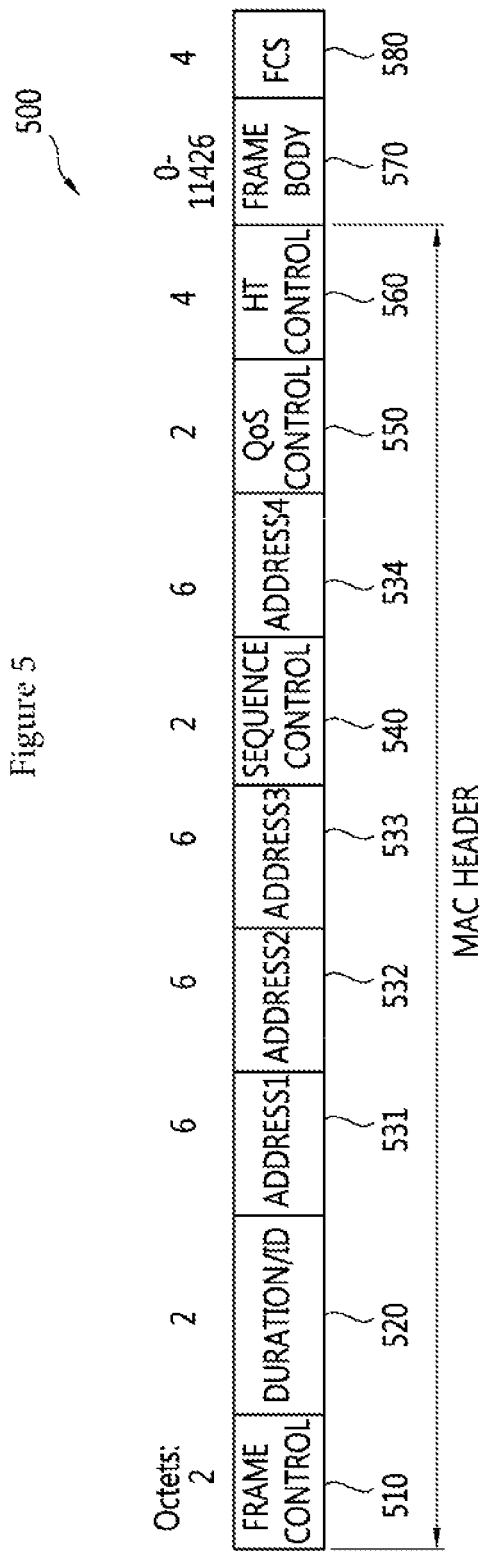
FIG. 5 is a block diagram illustrating a format of an MAC frame provided by the WLAN system.

FIG. 5 is a block diagram illustrating a format of an MAC frame provided by the WLAN system. The MAC frame may be an MAC protocol data unit (MPDU) (a PSDU when transmitted to a PHY layer) included in the data field of the above-described PPDU.

Referring to FIG. 5, an MAC frame 500 includes a frame control field 510, a duration/ID field 520, an address 1 field 531, an address 2 field 532, an address 3 field 533, a sequence control field 540, an address 4 field 534, a quality of service (QoS) control field 550, an HT control field 560, a frame body 570, and a frame check sequence (FCS) field 580.

The frame control field 510 includes information on the characteristics of a frame. The frame control field may include protocol version information that indicates the version of the WLAN standard supported by the frame 500 and information on a type and subtype for identifying the function of the frame.

The duration/ID field 520 may be realized to have different values in accordance with the type and subtype of the frame 500. When the frame 500 is determined as the PS-poll frame for power save operation by the type and subtype of the frame 500, the duration/ID field 520 may be configured to include the association identifier (AID) of the STA that transmits the frame 500. In the other cases, the duration/ID field 520 may be configured to have a specific duration value in accordance with the type and subtype of the frame 500. When the frame 500 is the MPDU included in an A-MPDU format, the duration/ID fields 520 included in the MAC headers of the MPDUs may be realized to have the same value.

The address 1 field to the address 4 field 531 to 534 may be configured to realize specific fields among a basic set service identification (BSSID) field for indicating BSSID, a source address (SA) field for indicating an SA, a destination address (DA) field for indicating a DA, a transmitting address (TA) field for indicating a transmitted STA address, and a receiving address (RA) field for indicating a received STA address. Meanwhile, an address field realized as a TA field may be configured to indicate a bandwidth signaling TA value. In this case, the TA field may indicate that the frame contains additional information in a scrambling sequence. The bandwidth signaling TA may be represented as a MAC address of a STA transmitting the relevant frame, and an individual/group bit in the MAC address may be set to a predetermined value, e.g. '1'.

The sequence control field 540 is configured to include a sequence number and a fragment number. The sequence number may indicate the sequence number allotted to the frame 500. The fragment number may indicate the numbers of the fragments of the frame 500.

The QoS control field 550 includes information on QoS.

The HT control field 560 includes control information on an HT transmitting and receiving method and/or a VHT transmitting and receiving method. Realization of the HT control field 560 will be described in detail hereinafter.

The frame body 570 may include data to be transmitted by a transmitted STA and/or AP. Body components excluding an MAC header and an FCS from a control frame, a management frame, an action frame, and/or a data frame to be transmitted may be realized in the frame body 570. When the frame 500 is the management frame and/or the action frame, information elements included in the management frame and/or the action frame may be realized in the frame body 570.

The FCS field 580 includes a bit sequence for cyclic redundancy check (CRC).

Hereinafter, the above-described HT control field will be described in detail with reference to the drawing.

Figure 6:
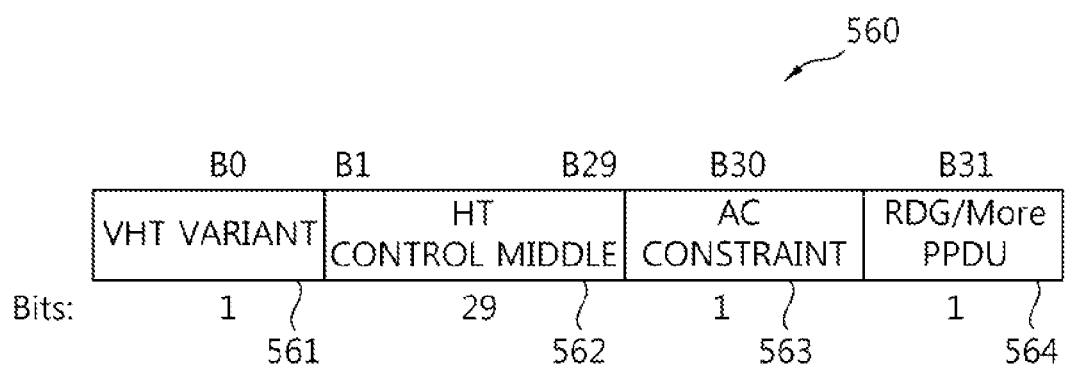
FIG. 6 is a block diagram illustrating a format of the HT control field.

FIG. 6 is a block diagram illustrating a format of the HT control field.

Referring to FIG. 6, the HT control field 560 includes a VHT variant field 561, an HT control middle field 562, an access category (AC) constraint field 563, and an RDG/More PPDU field 564.

The VHT variant field 561 indicates whether the HT control field 560 has a format of an HT control field for VHT or a format of an HT control field for HT. For example, the VHT variant field 561 may be realized by a field having length of 1 bit. According to the value, it may be indicated whether the HT control middle field 562 is realized by the format for HT or the format for VHT.

The HT control middle field 562 may be realized to have another formats in accordance with the indication of the VHT variant field 561. Detailed realization of the HT control middle field 562 will be described in detail hereinafter.

The AC constraint field 563 indicates whether a mapped AC of a reverse direction (RD) data frame is limited to a single AC.

The RDG/More PPDU field 564 may be differently interpreted in accordance with the corresponding filed is transmitted by an RD initiator or an RD responder. In the case where the corresponding field is transmitted by the RD initiator, when the RDG/More PPDU field is configured as '1', it may be interpreted that the RDG exists and may be defined by the duration/ID field. In the case where the corresponding field is transmitted by the RD responder, when the RDG/More PPDU field is configured as '0', it may be interpreted as indicating that the PPDU including the field is the final frame transmitted by the RD responder. When the RDG/More PPDU field is configured as '1', it may be interpreted as indicating another PPDU is transmitted following the PPDU including the field.

Figure 7:
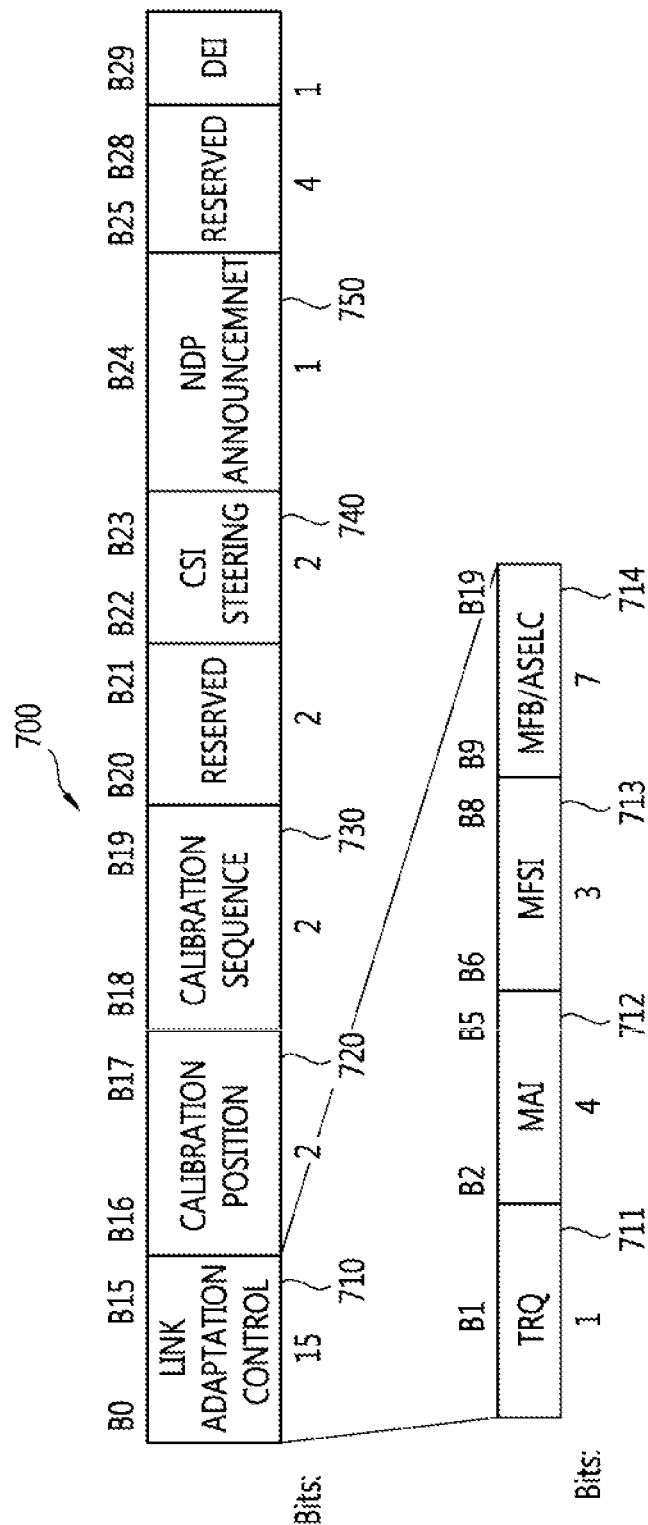
FIG. 7 is a block diagram illustrating a format of an HT variant middle field for HT.

FIG. 7 is a block diagram illustrating a format of an HT variant middle field for HT.

Referring to FIG. 7, an HT variant middle field 700 for HT includes a link adaptation control subfield 710, a calibration position sub field 720, a calibration sequence subfield 730, a channel state information (CSI)/steering subfield 740, a null data packet (NDP) announcement subfield 750.

The link adaptation control subfield 710 includes a training request (TRQ) subfield 711, an modulation coding scheme (MCS) request (MRQ) or antenna selection (ASEL) indication (MAI) subfield 712, an MCAS feedback sequence identifier (MFSI) subfield 713, and an MCS feedback and antenna selection command/data (MFB/ASELC) subfield 714.

The TRQ subfield 711 includes information requesting a sounding responder to transmit a sounding frame. The MAI subfield 712 may include indication information requesting an MCS feedback or information indicating that the MFB/ASELC subfield 714 includes ASEL information. The MAI subfield 712 may include an MRQ sequence identifier (MSI) subfield including an MCS request (MRQ) indication bit and a sequence number for identifying MRQ. Whether the MCS feedback is requested may be indicated by configuring a value of a subfield. The MFSI subfield 713 may be configured by a received value of the MSI included in the frame related to the MFB information. The MFB/ASELC subfield 714 includes the MFB information or the ASEL information.

The calibration position subfield 720 and the calibration sequence subfield 730 include the position of a calibration sounding exchange sequence and identification information on a calibration sequence.

The CSI/steering subfield 740 indicates information indicating a feedback type.

The NDP announcement subfield 750 may be configured as NDP announcement indication information that announces that an NDP is to be transmitted following the currently transmitted PPDU. The NDP announcement subfield 750 may be configured by a field of 1 bit. An STA that receives a PPDU may confirm whether the corresponding PPDU is an NDPA frame through the value of the NDP announcement subfield 750.

Figure 8:
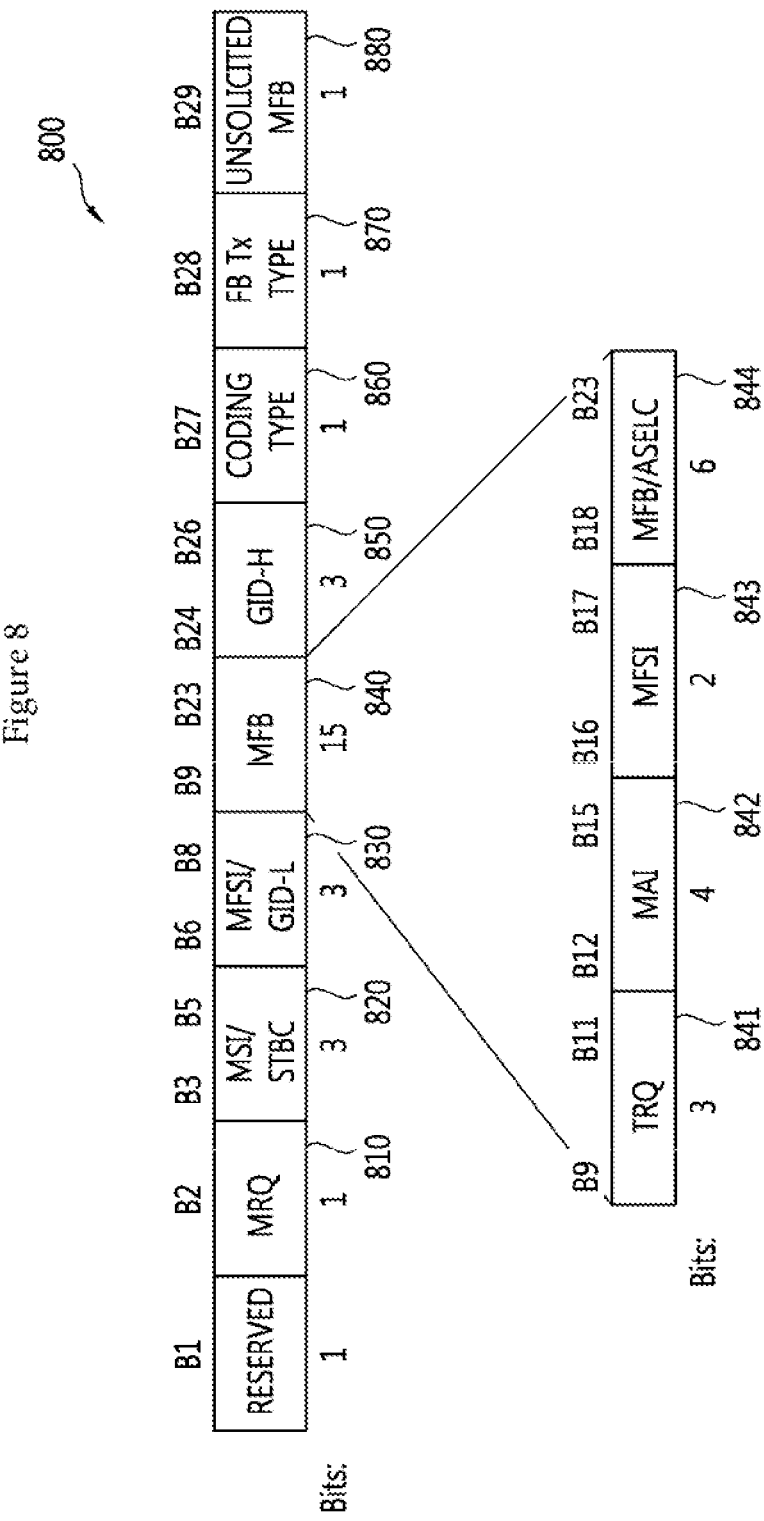
FIG. 8 is a block diagram illustrating a format of an HT variant middle field for VHT.

FIG. 8 is a block diagram illustrating a format of an HT variant middle field for VHT.

Referring to FIG. 8, an HT variant middle field 800 for VHT includes an MRQ subfield 810, an MSI subfield 820, an MFSI/GID-L subfield 830, an MFB subfield 840, a GID-H subfield 850, a coding type subfield 860, an FB Tx type subfield 870, and a unsolicited MFB subfield 880.

The MRQ subfield 810 indicates whether the MCS feedback is requested. The MRQ subfield 810 may be realized as requesting the MCS feedback configured as '1'.

When the MRQ subfield 810 indicates that the MCS feedback is requested, the MSI subfield 820 includes a sequence number identifying the specific request.

The unsolicited MFB subfield 880 may indicate whether the included MFB information is a response to the MRQ. When the unsolicited MFB subfield 880 is configured as '1', the included MFB information may be realized as a response to the MRQ. When the unsolicited MFB subfield 880 is configured as '0', the included MFB information may be realized as not being a response to the MRQ.

The MFSI/GID-L subfield 830 may be differently interpreted in accordance with the configuration of the unsolicited MFB subfield 880. When the unsolicited MFB subfield 880 indicates that the included MFB information is a response to the MRQ, the received value of the MSI included in the frame related to the MFB information may be included. When the unsolicited MFB subfield 880 indicates that the included MFB information is not a response to the MRQ, the lowest 3 bits that configure the IDs of a group of PPDUs related to the unsolicited MFB information may be included.

The MFB subfield 840 may include recommended MFB information. The MFB subfield 840 may include a VHT N_STS subfield 841, an MCS subfield 842, a BW subfield 843, and a signal-to-noise (SNR) subfield 844. The VHT N_STS subfield 841 indicates the number of recommended spatial streams. The MCS subfield 842 indicates a recommended MCS. The BW subfield 843 indicates bandwidth information related to the recommended MCS. The SNR subfield indicates an average SNR value on data subcarriers and spatial streams.

When the unsolicited MFB subfield 880 indicates that the MFB information is not a response to the MRQ and the MFB is estimated from a PPDU for transmitting and receiving an MU, the GID-H subfield 850 may include the highest 3 bits that configure the IDs of the group of the PPDUs related to the unsolicited MFB information. When the MFB is estimated from a PPDU for transmitting receiving an SU, the GID-H subfield 850 may include a bit sequence configured as 1.

When the unsolicited MFB subfield 880 indicates that the MFB information is not a response to the MRQ, the coding type subfield 860 may include coding information (BCC or LDPC) on the frame in which the unsolicited MFB information is estimated.

The FB Tx type subfield 870 may be configured to indicate the transmission type of an estimated PPDU. That is, the FB Tx type subfield 870 may indicate whether the estimated PPDU is beamformed.

The VHT variant field 561 may distinguish the HT control field for VHT from the HT control field for HT based on the control information included in the HT control middle field 562.

On the other hand, a next generation wireless LAN system supports transmission of an MU-MIMO method in which a plurality of STAs simultaneously access a channel in order to efficiently use a wireless channel. According to the MU-MIMO transmitting method, an AP may simultaneously transmit a packet to at least one MIMO paired STA.

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 9.

Figure 9:
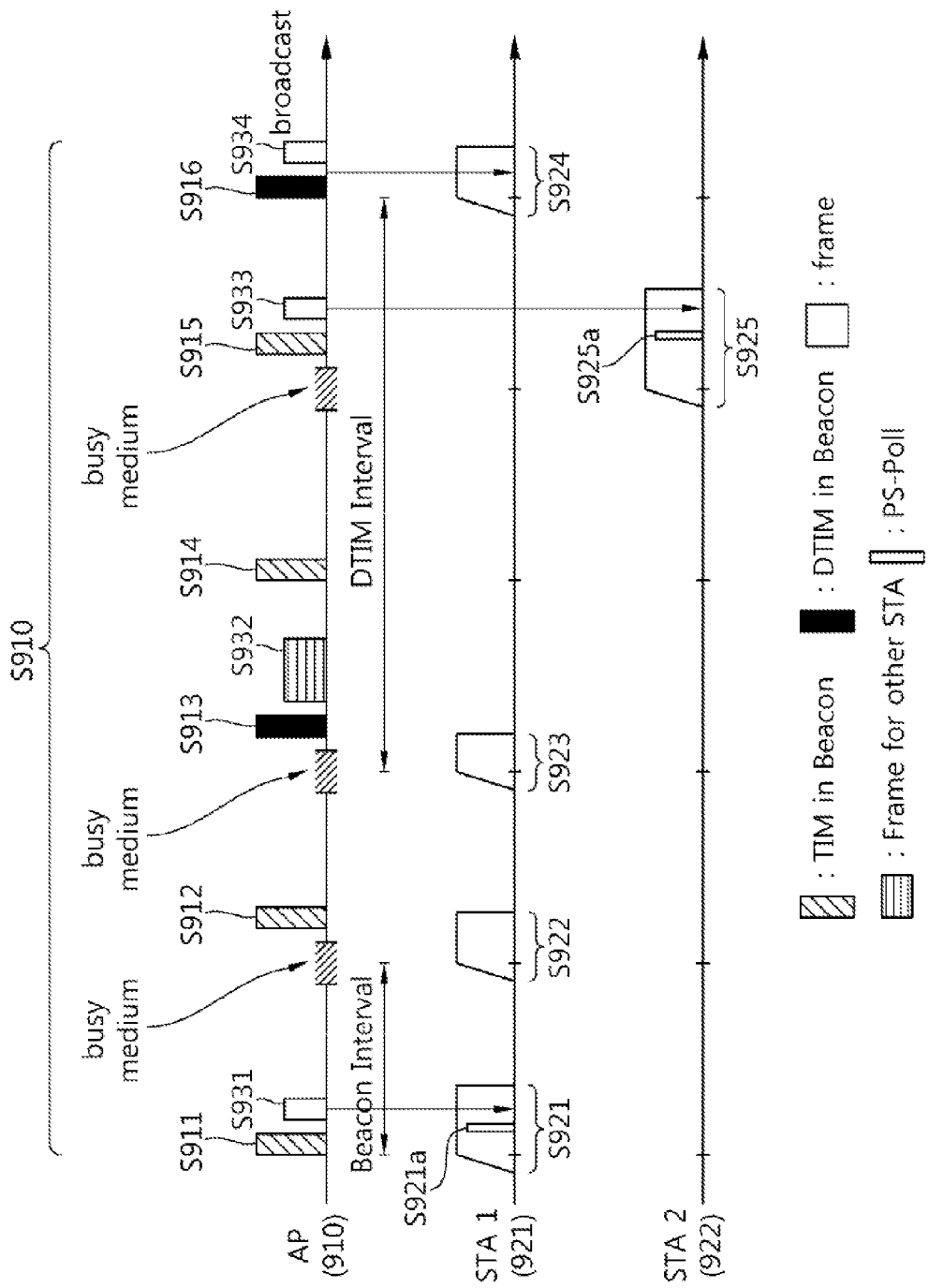
FIG. 9 shows an example of a power management operation.

FIG. 9 shows an example of a power management operation.

Referring to FIG. 9, an AP 910 transmits a beacon frame to STAs in a BSS in accordance with a specific period (step S910). The beacon frame includes a traffic indication map (TIM) information element. The TIM element includes information for indicating that the AP 910 has a bufferable frame (or bufferable unit) for the STAs associated with the AP being buffered and the frame will be transmitted. Examples of the TIM element include a TIM used to report a unicast frame and a delivery traffic indication map (DTIM) used to report a multicast or broadcast frame.

The AP 910 transmits the DTIM one time whenever a beacon frame is transmitted three times.

An STA1 921 and an STA2 922 are STAs operating in a PS mode. The STA1 921 and the STA2 922 can be configured such that they can transition from a doze state to an awake state in every wakeup interval of a specific period to receive the TIM element transmitted by the AP 910.

A specific wakeup interval can be configured such that the STA1 921 transitions to the awake state in every beacon interval to receive the TIM element. Therefore, the STA1 921 transitions to the awake state (step S921) when the AP 910 transmits a first beacon frame (step S911). The STA1 921 receives the beacon frame and acquires the TIM element. If the acquired TIM element indicates that a bufferable frame to be transmitted to the STA 1921 is buffered, then the STA1 921 transmits to the AP 910 a PS poll frame that requests the AP 910 to transmit a frame (step S921*a*). The AP 910 transmits the frame to the STA1 921 in response to the PS poll frame (step S931). Upon completion of frame reception, the STA1 921 operates by transitioning back to the doze state.

When the AP 910 transmits a second beacon frame, a medium is busy, that is, another device accesses to the medium for example. Thus, the AP 910 may not be able to transmit the beacon frame in accordance with a correct beacon interval but may transmit it at a delayed time point (step S912). In this case, the STA1 921 switches its mode to the wake state in accordance with the beacon interval, but cannot receive the beacon frame transmitted with delay, and thus transitions back to the doze state (step S922).

When the AP 910 transmits a third beacon frame, the beacon frame may include a TIM element which is configured as a DTIM. However, since the medium is busy, the AP 910 transmits the beacon frame with delay (step S913). The STA1 921 operates by transitioning to the awake state in accordance with the beacon interval, and can acquire the DTIM by using the beacon frame transmitted by the AP 910. The DTIM acquired by the STA1 921 indicates that there is no frame to be transmitted to the STA1 921 and there is a frame for another STA. Therefore, the STA1 921 operates by transitioning back to the doze state. After transmitting the beacon frame, the AP 910 transmits the frame to a corresponding STA (step S932).

The AP 910 transmits a fourth beacon frame (step S914). However, since the STA1 921 cannot acquire information indicating that there is buffered traffic for the STA 921 by receiving the TIM element two times, the STA1 921 may regulate a wakeup interval for receiving the TIM element. Alternatively, if signaling information for regulating a wakeup interval value of the STA1 921 is included in the beacon frame transmitted by the AP 910, the wakeup interval value of the STA1 921 may be regulated. Instead of transitioning an operation state for every beacon interval to receive the TIM element, the STA1 921 can be configured in the present embodiment such that the operation state is transitioned one time for every three beacon intervals. Therefore, the STA1 921 cannot acquire a corresponding TIM element since the AP 910 transmits the fourth beacon frame (step S914), and maintains the doze state when a fifth beacon frame is transmitted (step S915).

When the AP 910 transmits a sixth beacon frame (step S916), the STA1 921 operates by transitioning to the awake state, and acquires the TIM element included in the beacon frame (step S924). The TIM element is a DTIM that indicates existence of a broadcast frame, and thus the STA1 921 receives the broadcast frame transmitted by the AP 910 (step S934) instead of transmitting a PS poll frame to the AP 910.

Meanwhile, the wakeup interval assigned to the STA2 922 may have a longer period than that of the STA1 921. Therefore, the STA2 922 can receive the TIM element by transitioning to the awake state (step S925) when the fifth beacon frame is transmitted (step S915). The STA2 922 knows existence of a frame to be transmitted to the STA2 922 by using the TIM element, and transmits a PS poll frame to the AP 910 to request transmission (step S925a). The AP 910 transmits a frame to the STA2 922 in response to the PS poll frame (step S933).

In order to operate the PS mode of FIG. 9, the TIM element includes a TIM that indicates whether there is a frame to be transmitted to the STA or a DTIM that indicates whether there is a broadcast/multicast frame. The DTIM may be implemented by configuring a field of the TIM element.

Figure 10:
FIG. 10 shows an example of a TIM element format.

FIG. 10 shows an example of a TIM element format.

Referring to FIG. 10, a TIM element 1000 includes an element ID field 1010, a length field 1020, a DTIM count field 1030, a DTIM period field 1040, a bitmap control field 1050, and a partial virtual bitmap field 1060.

The element ID field 1010 is a field indicating that a corresponding information element is a TIM element. The length field 1020 indicates a total length including this field and its subsequent fields. A maximum value may be 255, and its unit may be set to an octet value.

The DTIM count field 1030 informs whether a current TIM element is a DTIM. If it is not the DTIM, the DTIM count field 1030 indicates the number of remaining TIM elements until the DTIM is transmitted. The DTIM period field 1040 indicates a period according to which the DTIM is transmitted. The DTIM transmission period may be set to a multiple of the number of times of transmitting a beacon frame.

The bitmap control field 1050 and the partial virtual bitmap field 1060 indicate whether a bufferable frame is buffered for a specific STA. A $1^{st}$ bit of the bitmap control field 1050 indicates whether there is a multicast/broadcast frame to be transmitted. The remaining bits are set to indicate an offset value for interpreting the subsequent partial virtual bitmap field 1060.

The partial virtual bitmap field 1060 is set to a value that indicates whether there is a frame to be transmitted to each STA. This may be set in a bitmap format in which a bit value corresponding to an AID value of the specific STA is set to 1. According to an AID order, bits can be assigned from 1 to 2007 in sequence. For example, if a $4^{th}$ bit is set to 1, it implies that traffic to be transmitted to an STA having an AID of 4 is buffered in an AP.

Meanwhile, when setting a bit sequence of the partial virtual bitmap field 1060, it may be ineffective to use all bit sequences that constitute a bitmap in a situation where there are many consecutive zero bits. For this, offset information for the partial virtual bitmap field 1060 may be included in the bitmap control field 1050.

Figure 11:
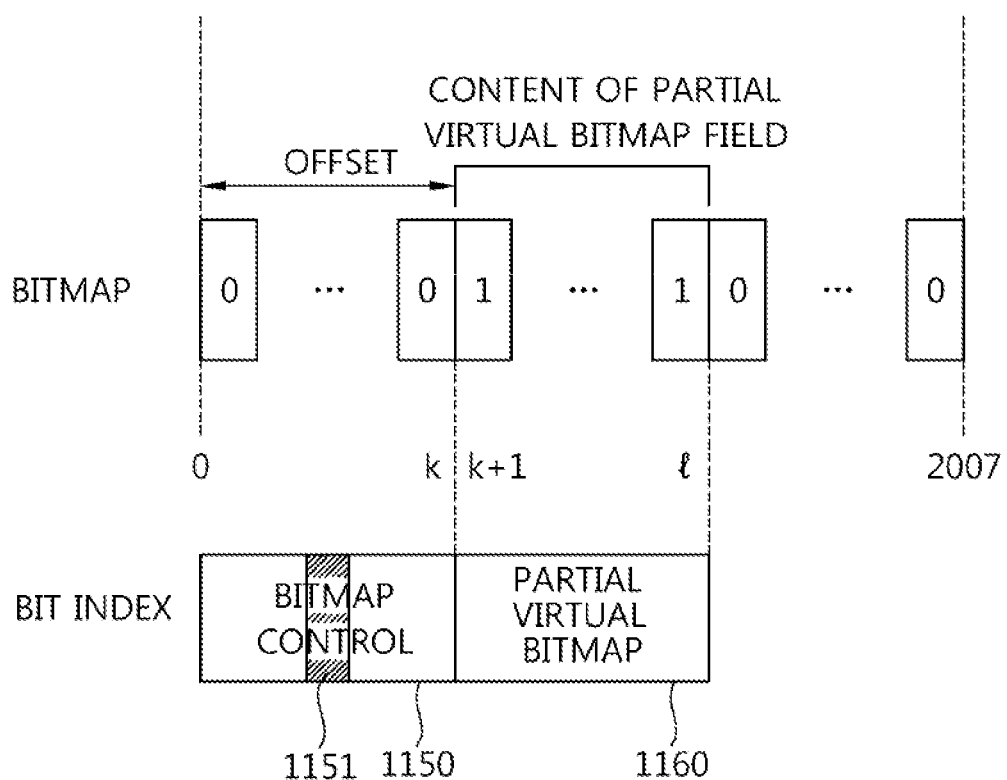
FIG. 11 shows an example of a bitmap control field and a partial virtual bitmap field according to an embodiment of the present invention.

FIG. 11 shows an example of a bitmap control field and a partial virtual bitmap field according to an embodiment of the present invention.

Referring to FIG. 11, a bitmap sequence that constitutes a partial virtual bitmap field 1060 indicates whether there is buffered frame for an STA having an AID corresponding to a bitmap index thereof. The bitmap sequence constitutes indication information for AIDs from 0 to 2007.

The bitmap sequence can be configured such that 0 is set consecutively from an initial bit to a $k^{th}$ bit. In addition, the bitmap sequence can be configured such that 0 is set consecutively from an $i^{th}$ bit to a last bit. This indicates that there is no buffered frame for each of STAs assigned with AIDs 0 to k and each of STAs assigned with AIDs i to 2007. As such, a size of the TIM element can be decreased in such a manner that offset information is provided for consecutive zero sequences from 0 to k located in a first portion of the bitmap sequence and by omitting consecutive zero sequences located in a last portion thereof.

For this, a bitmap control field 1050 may include a bitmap offset subfield 1051 including offset information of consecutive zero sequences of the bitmap sequence. The bitmap offset subfield 1051 can be set to indicate k. The partial virtual bitmap field 1060 can be set to include bits from a $(k+1)^{th}$ bit to a $(i-1)^{th}$.

A detailed responding procedure of an STA that receives a traffic indication map (TIM) element may be described with reference to FIGS. 12 to 14.

Figure 12:
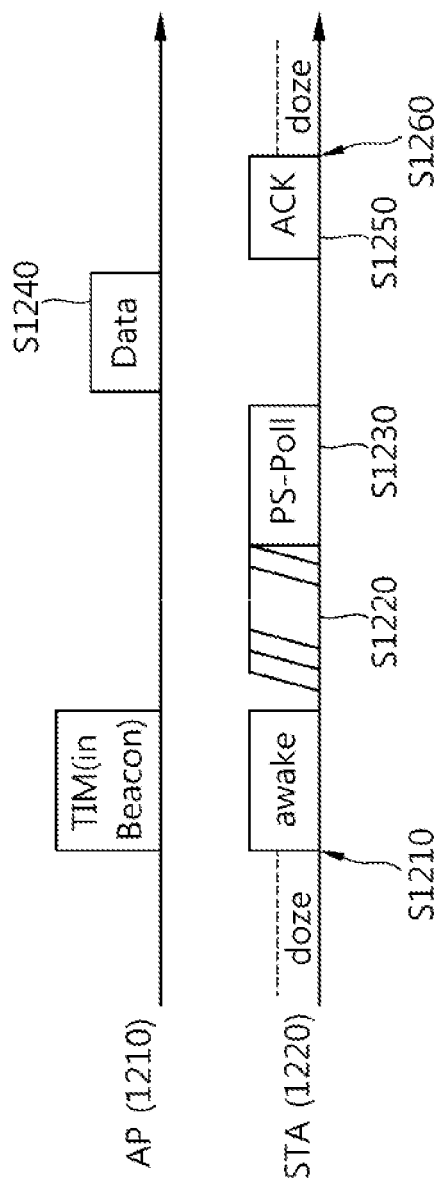
FIG. 12 is a flowchart illustrating an example of a responding procedure of an AP in a TIM protocol.

FIG. 12 is a flowchart illustrating an example of a responding procedure of an AP in a TIM protocol.

Referring to FIG. 12, an STA 1220 switches an operation state from a doze state to an awake state in order to receive a beacon frame including a TIM from an AP 1210 (S1210). The STA 1220 interprets the received TIM element to know a buffered frame to be transmitted thereto exists.

The STA 1220 contends with other STAs in order to access a medium for transmitting a PS-poll frame (S1220) and transmits the PS-poll frame in order to request the AP 1210 to transmit a data frame (S1230).

The AP 1210 that receives the PS-poll frame transmitted by the STA 1220 transmits the frame to the STA 1220 (S1240). The STA2 1220 receives the data frame and transmits an acknowledgement (ACK) frame to the AP 1210 as a reception response (S1250). Then, the STA2 1220 switches an operation mode from the awake mode to the doze state (S1260).

As illustrated in FIG. 12, the AP may transmit data at specific timing after receiving the PS-poll frame unlike an immediate response in which the data frame is immediately transmitted when the PS-poll frame is received from the STA.

Figure 13:
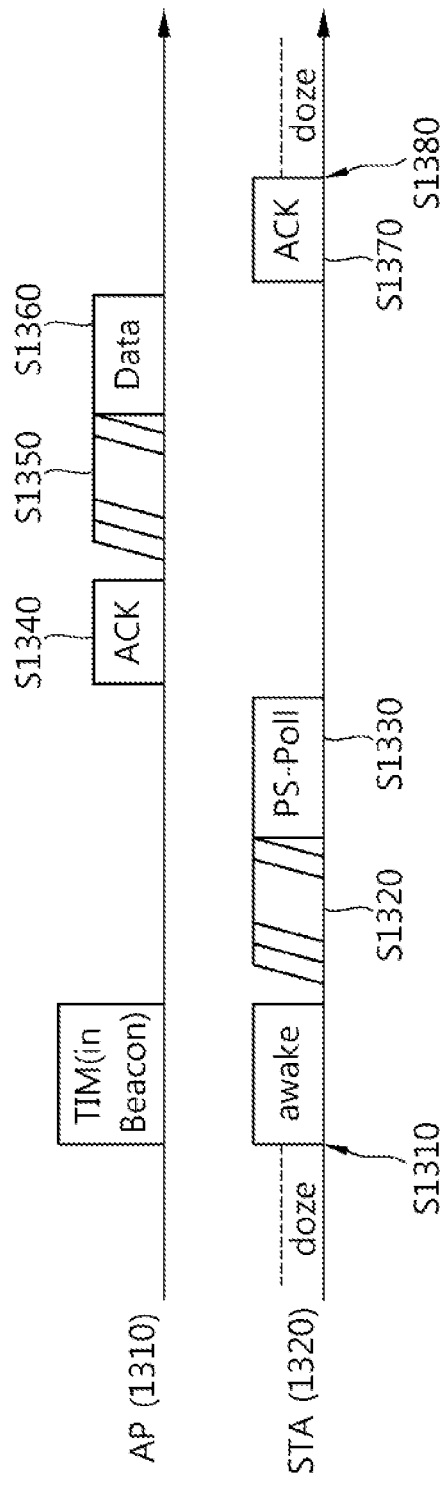
FIG. 13 is a flowchart illustrating another example of a response procedure of an AP in a TIM protocol.

FIG. 13 is a flowchart illustrating another example of a response procedure of an AP in a TIM protocol.

Referring to FIG. 13, an STA 1320 switches an operation state from a doze state to an awake state in order to receive a beacon frame including a TIM from an AP 1310 (S1310). The STA 1320 interprets the received TIM element to know a buffered frame to be transmitted thereto exists.

The STA 1320 contends with other STAs in order to access a medium for transmitting a PS-poll frame (S1320) and transmits the PS-poll frame in order to request the AP 1310 to transmit a data frame (S1330).

When the AP 1310 does not prepare the data frame at specific time interval like a short interframe space (SIFS)

after receiving the PS-poll frame, the data frame is not immediately transmitted but the ACK frame is transmitted to the STA 1320 (S1340), which is the characteristic of a deferred response unlike in S1240 where the AP 1210 of FIG. 12 immediately transmits the data frame to the STA 1220 to correspond to the PS-poll frame.

The AP 1310 performs contention when the data frame is prepared after the ACK frame is transmitted (S1350) and transmits the data frame to the STA 1320 (S1360).

The STA 1320 transmits the ACK frame to the AP 1310 as the reception response to the data frame (S1370) and switches the operation mode from the awake state to the doze state (S1380).

When the AP transmits a delivery traffic indication map (DTIM) to the STA, the procedure of the TIM protocol that proceeds after the transmission of the DTIM may vary.

Figure 14:
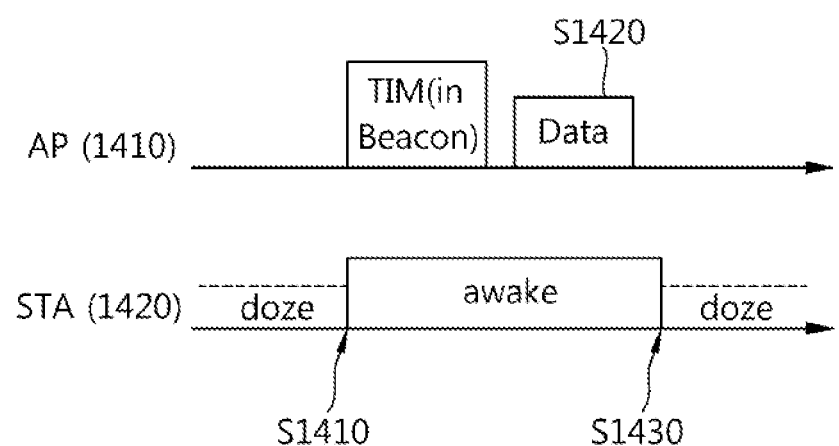
FIG. 14 is a flowchart illustrating a procedure of a TIM protocol by a DTIM.

FIG. 14 is a flowchart illustrating a procedure of a TIM protocol by a DTIM.

Referring to FIG. 14, STAs 1420 change an operation state from a doze state to a awake state in order to receive a beacon frame including a TIM element from an AP 1410 (S1410). The STAs 1420 may know that a multicast/broadcast frame is to be transmitted through the received DTIM.

The APs 140 transmit the multicast/broadcast frame after transmitting the beacon frame including the DTIM (S1420). The STAs 1420 switches the operation state from the awake state to the doze state after receiving the multicast/broadcast frame transmitted by the AP 1410 (S1430).

In a power save mode operating method based on the TIM protocol that is described with reference to FIGS. 9 to 14, the STAs may confirm whether buffered frames to be transmitted exist by traffics buffered through STA identification information included in the TIM element. The STA identification information may be information on association identifiers (AID) allotted when the STAs are associated with the AP. The STA identification information may be configured to directly indicate the AIDs of the STAs related to buffered frames or may be configured as a bit map type in which a bit order corresponding to AID values is configured by a specific value. The STAs may know that the STAs have buffered frames when the STA identification information indicates the AIDs of the STAs.

On the other hand, a power management operation based on automatic power save delivery (APSD) may be provided for the power save of the STA.

The AP that may support the APSD signals that the APSD may be supported by an APSD subfield in the ability value information fields of a beacon frame, a probe response frame, and a combination response frame. The STA that may support the APSD uses a power management field in the frame control field of a frame in order to indicate whether operation is performed in an active mode or a power save mode.

The APSD is a mechanism for delivering downlink data and a bufferable management frame to an STA that operates in the power save mode. The frame transmitted by the STA in the power save mode that is using the APSD configures the power management bit of the frame control field as 1. Therefore, buffering may be caused by the AP.

The APSD defines two delivery mechanisms of unscheduled-APSD (U-APSD) and scheduled-APSD (S-APSD). The STAs may use the U-APSD so that parts or all of the bufferable units (BU) thereof may be delivered in a service period (SP) that is not scheduled. The STAs may use the S-APSD so that parts or all of the BUs thereof may be delivered.

The STAs that use the U-APSD may not receive the frame transmitted by the AP in the SP due to interference. The AP may not sense the interference. However, the AP may determine that the STAs do not correctly receive the frame. A U-APSD coexistence ability value has the STAs indicate requested transmission duration to the AP so that the transmission duration may be used as an SP for the U-APSD. The AP may transmit the frame in the SP so that it is possible to improve a probability of receiving the frame in a state where the STAs are interfered. In addition, the U-APSD may reduce a probability in which the frame transmitted by the AP may not be successfully received in the SP.

The STAs transmit an add traffic stream (ADDTS) request frame including a U-APSD coexistence element to the AP. The U-APSD coexistence element may include information on the requested SP.

The AP may process the requested SP and may transmit an ADDTS response frame in response to an ADDTS request frame. A state code may be included in the ADDTS request frame. The state code may indicate response information on the requested SP. The state code may indicate whether the requested SP is allowed and may further indicate a reason for rejection when the requested SP is rejected.

When the requested SP is allowed by the AP, the AP may transmit the frame to the STAs in the SP. The duration of the SP may be specified by the U-APSD coexistence element included in the ADDTS request frame. The start of the SP may be timing at which a trigger frame is transmitted to the AP so that the AP is normally received.

The STAs may enter the doze state when the U-APSD SP is expired.

In the WLAN system like the HT WLAN system that supports 20 MHz/40 MHz and the VHT wireless LAN system that supports 20 MHz/40 MHz/80 MHz/contiguous 160 MHz/non-contiguous 160 MHz (80+80 MHz), services through multi channel are provided. In the wireless LAN system that supports the multi channel, definition on which channel bandwidth is to be used in each procedure performed for the STA that operates in the power save mode to receive the buffered frame from the AP is required.

Figure 15:
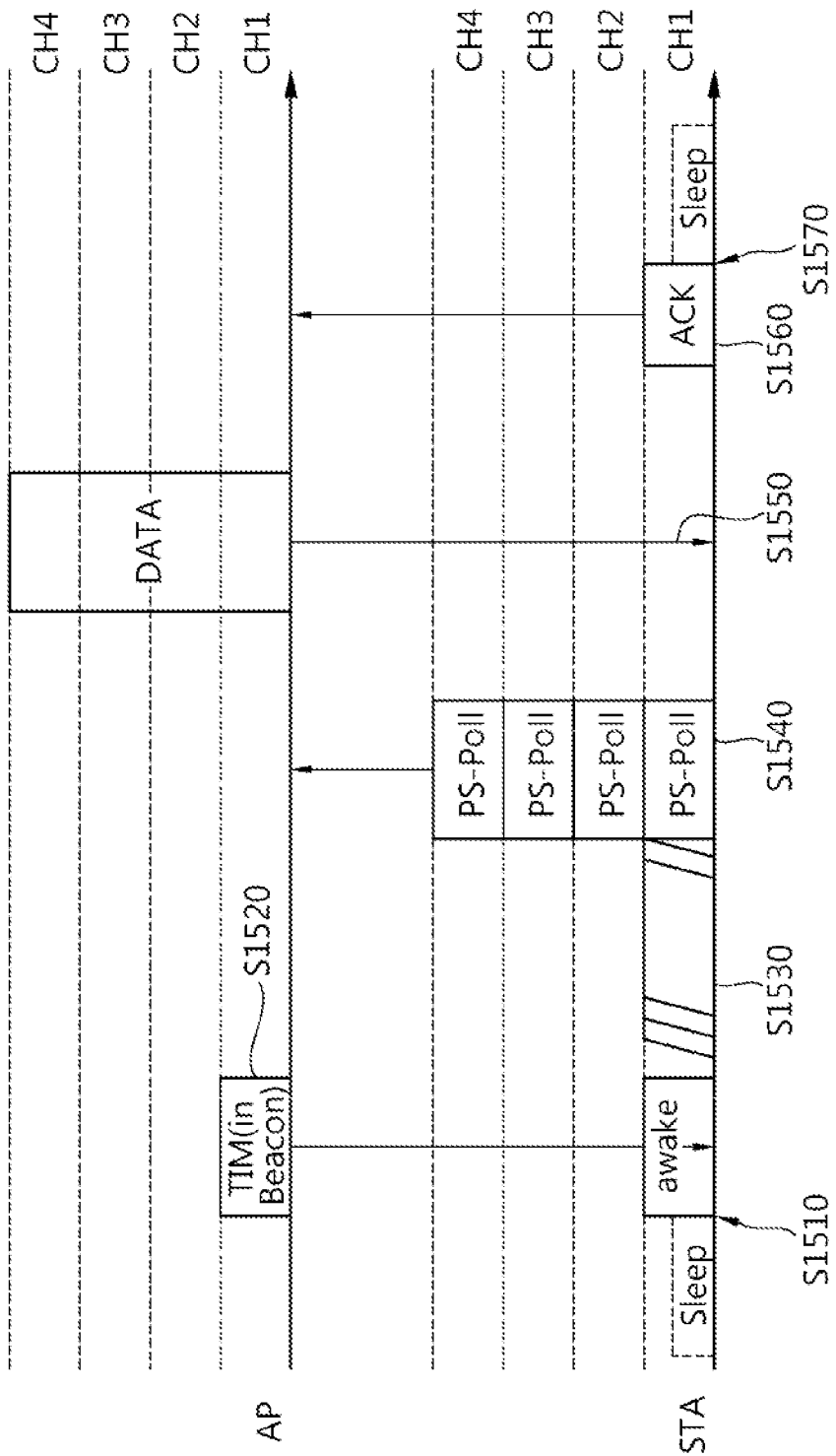
FIG. 15 shows an example of a method for transmitting and receiving frames by an STA that operates in a power save mode according to an embodiment of the present invention.

FIG. 15 shows an example of a method for transmitting and receiving frames by an STA that operates in a power save mode according to an embodiment of the present invention.

Referring to FIG. 15, an STA in a doze state enters an awake state in order to receive a TIM element (S1510).

The STA receives the TIM element (S1520). The TIM element may be included in a beacon frame to be transmitted. When the STA receives the TIM element, the STA may determine whether a bufferable frame for the STA is buffered based on a bitmap sequence of a partial virtual bitmap field included in the TIM element and the AID of the STA.

The STA that confirms that the bufferable frame is buffered may transmit the PS-poll frame to request the AP to transmit the buffered frame. It is necessary to transmit the PS-poll frame through multi channel in order to receive the buffered frame from the AP through the multi channel in a multi channel WLAN system.

In order to transmit the PS-poll frame through the multi channel, the STA that operates in the power save mode confirms whether the multi channel to be accessed is in an idle state (S1530). The STA that performs backoff in a primary channel confirms CCA for secondary channels after a backoff timer is expired and determines whether access to the multichannel may be performed. The PS-poll may be transmitted only to channels in the idle state that may be accessed.

The STA transmits the PS-poll frame to the AP through the multi channel (S1540). At this time, the PS-poll frame may be transmitted as a duplicate format. That the PS-poll is transmitted as the duplicate format means that unit PS-poll frames generated for unit bandwidths are transmitted through a plurality of adjacent channels. Referring to FIG. 15, it may be known that the unit PS-poll frames are transmitted through adjacent CH1 to CH4. When the unit bandwidth is 20 MHz bandwidth, it may mean that the 20 MHz PS-poll frames are transmitted through the CH1 to the CH4. For transmitting the PS-poll frame by the duplicate format, the AP may replicate a transmission of a PS-poll frame on a primary channel in at least one secondary channel.

Each of the unit bandwidth PS-poll frames of the PS-poll frames transmitted by the duplicate format may be realized by an individual PPDU format. That is, the unit PS-poll frames may have the formats illustrated in FIG. 4 for a single receiver.

The PS-poll frame may include information on transmission bandwidth. The STA may configure a CH_BANDWIDTH_IN_NON_HT parameter of TXVECTOR that is a transmission parameter as a value of bandwidth in which the entire unit PS-poll frames are transmitted in generating the PS-poll frame. Information on the CH_BANDWIDTH_IN_NON_HT parameter may be included in a scrambling sequence used for processing data fields included in the unit PS-poll frames, which will be described in detail.

Initial 7 bits in the scrambling sequence used for scrambling the data field including a PSDU, a service field, and a tail field may be commonly realized by a 7 bit pseudorandom nonzero integer sequence. When a specific PPDU is transmitted in accordance with the duplicate format, information indicating the bandwidth in which the plurality of unit PPDUs (the PPDUs of the duplicate format) are transmitted may be included in the scrambling sequence for scrambling the data fields of the unit PPDUs transmitted through the channels.

In addition, it is necessary that additional information that may indicate that bandwidth information is included in the scrambling sequence be included. For this purpose, an address field, e.g. a transmitter address (TA) field, in the MAC headers of each unit PS-poll frame may be configured as a bandwidth signaling TA. The bandwidth signaling TA indicates a MAC address of the STA transmitting the corresponding frame, and a individual/group bit in the MAC address may be set to '1' The bandwidth signaling TA may indicate that additional signaling information on the bandwidth signaling TAs is included. In detail, the bandwidth signaling TA may indicate that bandwidth information on the CH_BANDWIDTH_IN_NON_HT parameter is included in the scrambling sequence.

On the other hand, when a PPDU is commonly transmitted, bandwidth information may be included in a VHT-SIG-A field of the PPDU. In generating the PPDU, the transmitting STA may set the CH_BANDWIDTH parameter of a transmission parameter TXVECTOR to indicate bandwidth information for transmitting the PPDU. In realizing the PPDU based on the transmission parameter, the STA may configure bandwidth information in the BW field of the VHT-SIG-A field based on the value configured in the CH_BANDWIDTH parameter.

When the transmitting STA configures the TA field as a bandwidth signaling TA to generate the PPDU, CH_BANDWIDTH may be configured to be the same as CH_BANDWIDTH_IN_NON_HT.

That is, first bandwidth information indicating the entire bandwidth in which the PS-poll frame is transmitted may be included in the signal fields (the VHT-SIG-A fields) of the unit PS-poll frames which are included in the PS-poll frame and transmitted over the channels. In addition, the data fields may be scrambled based on the scrambling sequence including second bandwidth information indicating the entire bandwidth.

Referring to FIG. 15, the AP that receives the PS-poll frames from the STAs transmits the buffered frame to the STA in response to the PS-poll frame (S1550). In transmitting the buffered frame to the STA, the AP may transmit the buffered frames through bandwidth equal to or smaller than the bandwidth in the PS-poll frame is transmitted. For example, the AP may receive at least one unit PS-poll frame among the PS-poll frame of the duplicate format. In this case, the AP may transmit the buffered frame only through the channels that normally receive the at least one unit PS-poll frame. For another example, although the AP receives the at least one unit PS-poll frame among the PS-poll frames of the duplicate format, the buffered frame may be transmitted using the entire bandwidth in which the PS-poll frame of the duplicate format is transmitted. On the other hand, the channel determined not to be in the idle state through the CCA immediately before the AP receives the PS-poll frame may not be used for transmitting the buffered frame.

The STA receive the buffered frame from the AP and transmits an ACK frame to the AP (S1560). The ACK frame may be transmitted only through a primary channel. The ACK frame may be transmitted through the channels where the PS-poll frame is transmitted. The ACK frame may be transmitted through the channels where the buffered frame is transmitted.

The STAs may enter the doze state after transmitting the ACK frame (S1570).

According to the above-described frame transmitting and receiving method, in the multi channel WLAN system, the STA may transmit the PS-poll frame of the duplicate format to request to transmit the buffered frame and may signal bandwidth for transmitting the buffered frame. Therefore, the AP may transmit the buffered frame to the STA based on information on the bandwidth signaled by the PS-poll frame.

Figure 16:
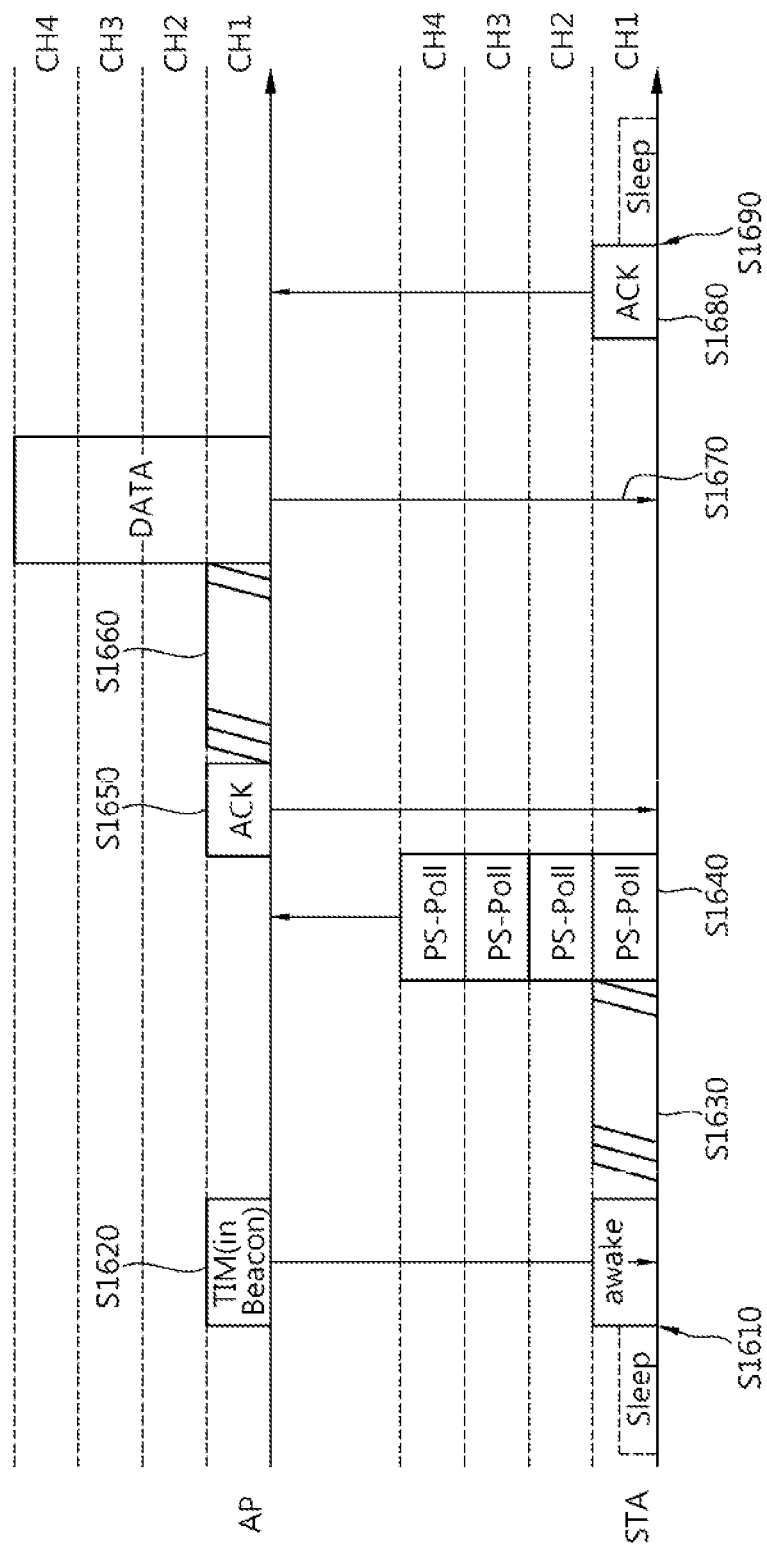
FIG. 16 shows another example of a method for transmitting and receiving frames by an STA operating in a power save mode according to an embodiment of the present invention.

FIG. 16 shows another example of a method for transmitting and receiving frames by an STA operating in a power save mode according to an embodiment of the present invention. FIG. 16 shows a method for transmitting and receiving frames based on deferred response.

Referring to FIG. 16, a STA in a doze state enters an awake state in order to receive a TIM element (S1610).

The STA receives the TIM element (S1620). The TIM element may be included in a beacon frame to be transmitted. When the STA receives the TIM element, the STA may determine whether a bufferabe frame therefor is buffered based on a bitmap sequence of a partial virtual bitmap field included in the TIM element and the AID of the STA.

The STA that confirms that the bufferabe frame is buffered may transmit a PS-poll frame to request the AP to transmit the buffered frame. In a multi channel WLAN system, in order to receive the buffered frame from the AP through the multi channel, it is necessary to transmit the PS-poll frame through the multichannel.

In order to transmit the PS-poll frame through the multi channel, the STA that operates in the power save mode confirms whether access to the multi channel to be accessed may be performed (S1630). The STA that performs backoff by a primary channel confirms CCA for secondary channels after a backoff timer is expired and determines whether access to the multichannel may be performed. The PS-poll frame may be transmitted only to the channels in an idle state that may be accessed.

The STA transmits the PS-poll frame to the AP through the multi channel (S1640). At this time, the PS-poll frame may be transmitted by a duplicate format as illustrated in S1550 of FIG. 15. A detailed method of transmitting the PS-poll frame and configuration of the PS-poll frame may follow the method and configuration described in detail in S1550 of FIG. 15.

The AP that receives the PS-poll frame from the STA may transmit the buffered frame as a response to the PS-poll frame. After receiving the PS-poll frame, the buffered frame to be transmitted may not be prepared. In this case the AP transmits an ACK frame as a response to the PS-poll frame like in the deferred response of FIG. 13 (S1650). The ACK frame may be transmitted on a primary channel. The ACK frame may be transmitted on a plurality of channels. In case where the AC frame is transmitted on the plurality of channels by duplicate format, the plurality of channels corresponds to the plurality of channels on which the PS-poll frame is transmitted. Alternatively, the plurality of channels corresponds to at least one channel over which the AP has normally received at least one unit PS-poll frame transmitted in the PS-poll frame of duplicate format On the other hand, the value of a receiver address (RA) field included in the ACK frame transmitted for the AP may be configured as the MAC address of the STA that receives the ACK frame. In detail, the RA field of the ACK frame may be configured from the TA field of the PS-poll frame. In the example, the TA field of the PS-poll frame is configured as a bandwidth signaling TA. In this case, the RA field of the ACK frame may be obtained from the TA field of the PS-poll frame, which may be configured as a non-bandwidth signaling TA. The non-bandwidth signaling TA may be obtained by configuring the individual/group bit of the bandwidth signaling TA as '0'.

After the ACK frame is transmitted, when a buffered frame to be transmitted is prepared, the AP confirms whether access to the multichannel may be performed in order to transmit the buffered frame through the multichannel (S1660). The STA that performs backoff by a primary channel confirms CCA for secondary channels after a backoff timer is expired and determines whether access to the multichannel may be performed. The buffered frame may be transmitted only to the channels in an idle state that may be accessed.

The AP transmits the buffered frame to the STA (s1670). In transmitting the buffered frame to the STA, the AP may transmit the buffered frame through bandwidth equal to or smaller than the bandwidth in which the PS-poll frame is transmitted. For example, the AP may receive at least one unit PS-poll frame among the PS-poll frame of the duplicate format. In this case, the AP may transmit the buffered frame only through channels that normally receive the at least one PS-poll frame. For another example, although the AP receives the at least one unit PS-poll frame among the PS-poll frame of the duplicate format, the buffered frame may be transmitted using the entire bandwidth in which the PS-poll frame of the duplicate format is transmitted. On the other hand, the channels determined not to be in the idle state through CCA immediately before the AP receives the PS-poll frame may not be used for transmitting the buffered frame.

The STA receives the buffered frame from the AP and transmits the ACK frame to the AP (S1680). The ACK frame may be transmitted only through a primary channel. The ACK frame may be transmitted through the channels where the PS-poll frame is transmitted. The ACK frame may be transmitted through the channels where the buffered frame is transmitted.

The STA may enter a doze state after transmitting the ACK frame (S1690).

In the embodiment of the present invention described in detail with reference to FIGS. 15 and 16, the AP transmits the PS-poll frame of the duplicate format to the STA through four adjacent channels and receives the buffered frame from the AP through no more than four channels as a response to the PS-poll frames. The number and proximity of channels for transmitting and receiving a frame are not limited. For example, the AP and/or the STA may transmit/receive the PS-poll frame and the buffered frame through two non-adjacent channel groups including adjacent channels. For example, in a next generation wireless LAN system, transmission and reception using non-contiguous 160 MHz bandwidth (80+80 MHz) may be applied to the frame transmitting and receiving method according to the present invention. When the unit bandwidth of the channel is 20 MHz, transmission/reception of the duplicated frame may be performed as follows.

1) 40 MHz duplicate format: transmission of a frame through a 20 MHz channel is duplicated so that the duplicated frame is transmitted through two adjacent 20 MHz channels.

2) 80 MHz duplicate format: transmission of a frame through a 20 MHz channel is duplicated so that the duplicated frame is transmitted through four adjacent 20 MHz channels.

3) Contiguous 160 MHz duplicate format: transmission of a frame through a 20 MHz channel is duplicated so that the duplicated frame is transmitted through eight adjacent 20 MHz channels.

4) Non-contiguous 160 MHz (80+80 MHz) duplicate format: transmission of a frame through a 20 MHz channel is duplicated so that the duplicated frame is transmitted through two channel groups each including four adjacent channels and that the two channel groups are not adjacent to each other.

On the other hand, according to the frame transmitting and receiving method based on the conventional TIM protocol, the STAs may know whether bufferable frame therefor is buffered through the TIM element transmitted by the AP. In this case, the STAs transmit the PS-poll frame to the AP based on a PS-poll mechanism to request to transmit the buffered frame. The AP receives the PS-poll frame and accesses channels through contention to transmit the frame to the STA. In this case, the AP may transmit one frame (PSDU) to the STA at one time. Therefore, when the amount of the buffered traffic for a specific STA is large, it is inefficient to process traffic.

In addition, exchange of RTS/CTS frames required when data is transmitted in order to prevent a hidden node problem causes a large amount of overhead to data transmission. In addition, in the U-APSD, it takes long for the STAs to transmit a trigger frame and to request the AP to transmit data and for the AP to prepare data to be transmitted to the STAs and to perform contention for data transmission. Since the STAs may unnecessarily maintain the awake state for the corresponding time, the efficiency of the power save may be deteriorated.

In order to provide the efficient frame transmitting and receiving method for the STA that operates in the power save mode, the U-APSD may be applied to the TIM protocol. The STA may receive a frame no less than once from the AP through the SP therefor. For this purpose, the STA may recognize that the buffered frame to be transmitted thereto by the AP exists through the TIM element of the beacon frame. Then, the STA may transmit the trigger frame to the AP to announce that the SP thereof is started and may request the AP to transmit the buffered frame for the buffered traffic.

For this purpose, a SP-poll frame is suggested by the present invention.

Figure 17:
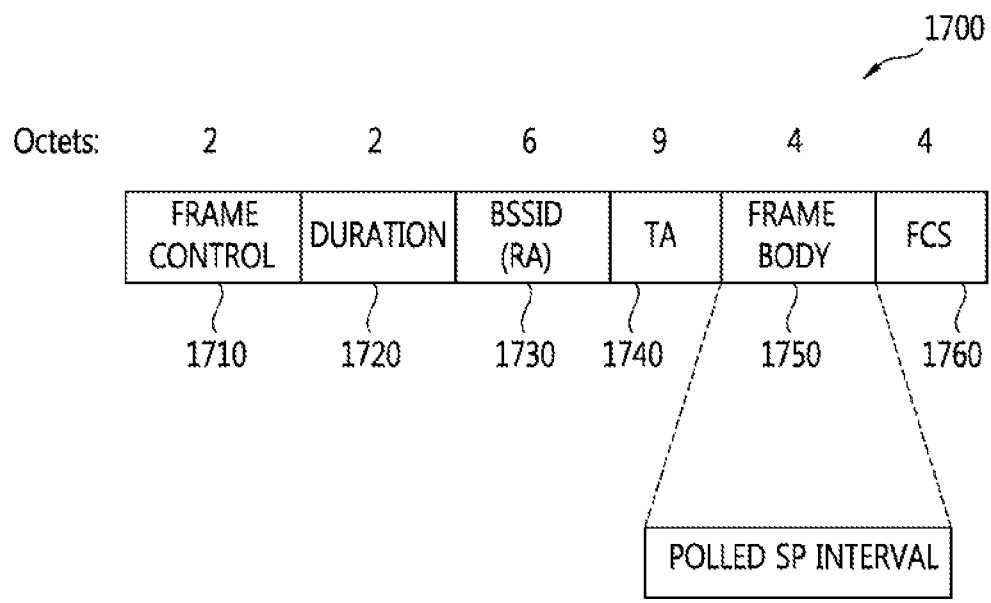
FIG. 17 is a block diagram illustrating an MAC frame format of an SP-poll frame according to an embodiment of the present invention.

FIG. 17 is a block diagram illustrating an MAC frame format of an SP-poll frame according to an embodiment of the present invention.

Referring to FIG. 17, a SP-poll frame 1700 may include a frame control field 1710, a duration field 1720, a BSSID (RA) field 1730, a TA field 1740, a frame body 1750, and an FCS field 1760.

The frame control field 1710 may indicate that the frame is an SP-poll frame.

The duration field 1720 may indicate the duration of the polled SP initiated by the SP-poll frame 1700. The duration field 1720 may be a basis of configuring the network allocation vector (NAV) of another STA that does not transmit the SP-poll frame 1700.

The BSSID (RA) field 1730 may include identification information on a BSS operated by the AP with which the STA is combined or identification information on the AP. The identification information may be BSSID.

The TA field 1740 may include identification information on the STA that transmits the SP-poll frame 1740. The identification information may be the MAC address of the STA. The identification information may include the AID of the STA.

The frame body 1750 may include a polled SP interval field indicating interval from timing at which the SP initiated by the SP-poll frame 1700 is terminated and a next SP is initiated.

The FCS field 1760 may include a sequence for CRC.

The STA may transmit the SP-poll frame to the AP to announce the SP of the STA to the AP. The SP initiated by the SP-poll frame may be referred to as a polled SP. The STA may request the AP to transmit data using the SP-poll frame. The AP may transmit the buffered frame to the STA in the initiated polled SP.

A frame transmitting and receiving method by the power save mode STA based on the SP-poll may be divided into an immediate SP-poll mechanism and a deferred SP-poll mechanism in accordance with the response of the AP that receives the SP-poll frame.

Figure 18:
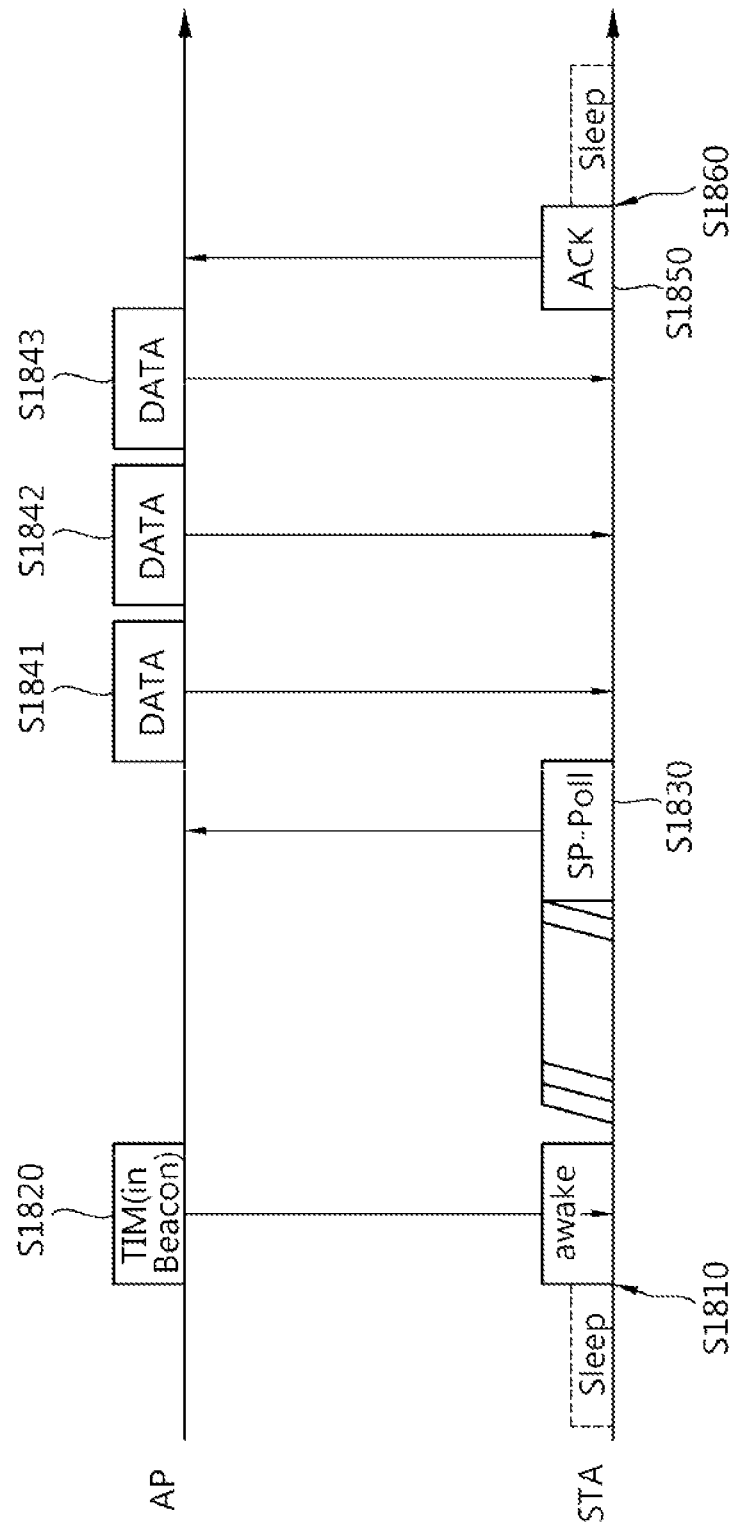
FIG. 18 shows an example of a method for transmitting and receiving frames by an STA that operates in a power save mode according to another embodiment of the present invention.

FIG. 18 shows an example of a method for transmitting and receiving frames by an STA that operates in a power save mode according to another embodiment of the present invention. The method for transmitting and receiving frames of FIG. 18 may be an example of a method transmitting and receiving frames according to an immediate SP-poll mechanism.

Referring to FIG. 18, the STA in the doze state enters the awake state in order to receive a TIM element (S1810).

The STA receives the TIM element (S1820). The TIM element may be included in a beacon frame to be transmitted. The TIM element may be included in a beacon frame to be transmitted. When the STA receives the TIM element, the STA may determine whether a bufferable frame therefor is buffered based on the bitmap sequence of a partial virtual bitmap field included in the TIM element and the AID of the STA.

The STA that confirms that the bufferable frame is buffered may obtain a channel access authority through contention and may transmit the SP-poll frame to request the AP to transmit the buffered frame (S1830).

The AP that receives the SP-poll frame transmits the at least one buffered frame to the STA after SIFS (S1841, S1842, and S1843). In this case, the AP may continuously transmit a plurality of buffered frames in the polled SP.

When a specific polled SP is not configured through additional signaling between the AP and the STA, an end of service period (EOSP) value may be configured as 1 in the final buffered frame transmitted by the AP to the STA in the polled SP. Therefore, the polled SP between the STA and the AP may be terminated.

On the other hand, a specific polled SP may be configured through additional signaling between the AP and the STA. For this purpose, the duration field of the SP-poll frame transmitted by the STA may be applied. In this case, the polled SP may be initiated at the timing when the STA transmits the SP-poll frame or when the AP receives the SP-poll frame. The polled SP may be configured from the initiation timing for the duration indicated by the duration field. The AP may transmit the buffered frame in accordance with polled SP duration. The STA may receive the buffered frame in accordance with the polled SP duration.

The STA may transmit the ACK frame to the AP when the polled SP is terminated (S1850). The STA enters the doze state after transmitting the ACK frame (S1860).

Figure 19:
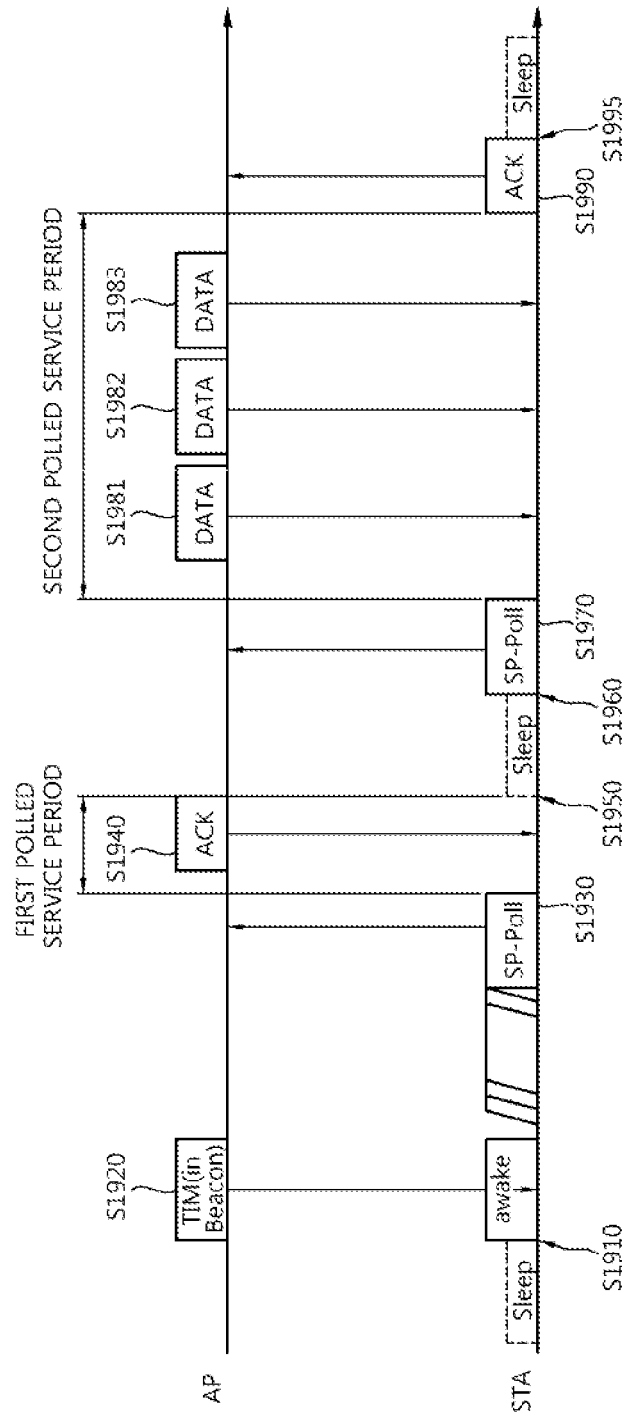
FIG. 19 shows another example of a method for transmitting and receiving frames by an STA that operates in a power save mode according to another embodiment of the present invention.

FIG. 19 shows another example of a method for transmitting and receiving frames by an STA that operates in a power save mode according to another embodiment of the present invention. The method for transmitting and receiving frames of FIG. 19 is based on the deferred SP-poll mechanism.

Referring to FIG. 19, an STA in a doze state enters an awake state in order to receive a TIM element (S1910).

The STA receives the TIM element (S1920). The TIM element may be included in a beacon frame to be transmitted. The TIM element may be included in a beacon frame to be transmitted. When the STA receives the TIM element, the STA may determine whether a bufferable frame therefor is buffered based on the bitmap sequence of a partial virtual bitmap field included in the TIM element and the AID of the STA.

The STA that confirms that the bufferable frame is buffered may obtain a channel access authority through contention and may transmit the SP-poll frame to request the AP to transmit the buffered frame (S1930). A first polled SP may be initiated by transmission of the SP-poll frame.

On the other hand, the AP receives the SP-poll frame and may not transmit the buffered frame to the STA in SIFS. In this case, the AP transmits an ACK frame to the STA after receiving the SP-poll frame (S1940).

The STA that receives the ACK frame as a response to the transmitted SP-poll frame may recognize that the AP may not transmit the buffered frame. In this case, the first polled SP initiated by the transmission of the SP-poll frame may be terminated. The STA receives the ACK frame and enters the doze state (S1950).

On the other hand, the STA enters an awake state at the timing indicated by the polled SP interval field of the SP-poll frame (S1960) and transmits the SP-poll frame to the AP (S1970).

On the other hand, the AP may previously know the timing at which a second polled SP starts through the polled SP interval field of the SP-poll frame received in S1930. Therefore, the AP may receive the SP-poll frame and may previously prepare the buffered frame to be transmitted to the STA after the SIFS so that the AP may transmit the at least one buffered frame to the STA (S1981, S1982, S1983, and S1984).

The duration of the second polled SP initiated by the STA transmitting the SP-poll frame (S1970) may be specified by the duration of the polled period described with reference to FIG. 18. That is, the polled duration may be terminated by transmitting the buffered frame including the EOSP field in which the AP is configured as '1'. That is, the polled duration may be terminated by the AP transmitting the buffered frame including the EOSP field configured as '1'. The second polled duration may be specified by the duration indicated by the duration field of the SP-poll frame transmitted by the STA in S1970.

The STA transmits the ACK frame to the AP (Si 990) when the second polled SP is terminated and may enter the doze state (S1995).

When the STA obtains the buffered frame from the AP based on the frame transmitting and receiving method according to the above-described embodiment, a device for preventing collision with frames transmitted and received by other STAs may be necessary. For this purpose, the other STAs may configure NAVs based on the SP-poll frame transmitted by the STA.

Figure 20:
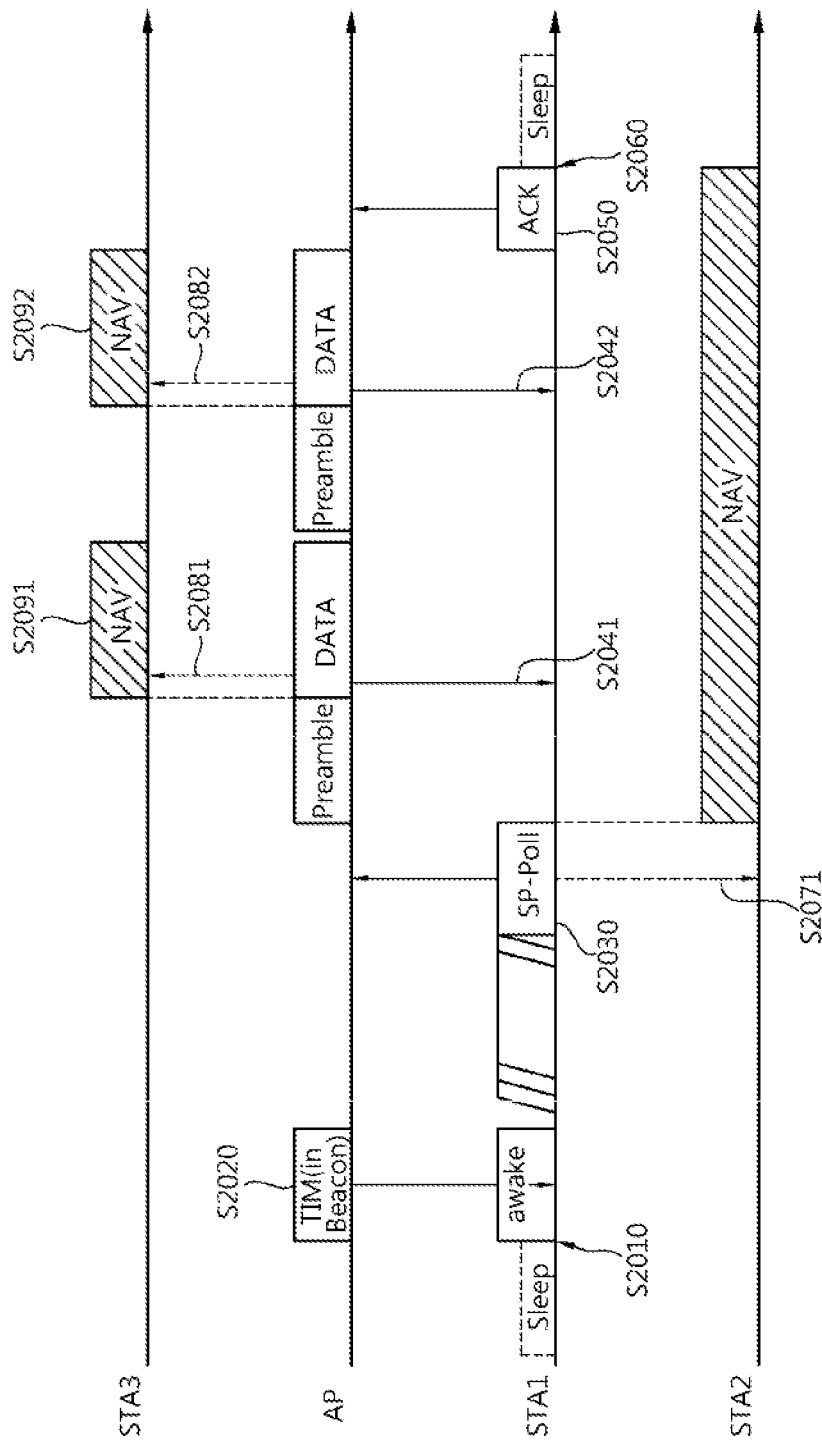
FIG. 20 shows still another embodiment of a method for transmitting and receiving frames according to the embodiment of the present invention.

FIG. 20 shows still another embodiment of a method for transmitting and receiving frames according to the embodiment of the present invention. In FIG. 20, it is assumed that an STA1 and an STA3 are positioned in the service coverage of the AP and that the STA2 is positioned in the coverage of the STA1.

Referring to FIG. 20, the STA1 enters an awake state in order to receive a TIM element (S2010) and receives the TIM element (S2020).

The STA that confirms that the bufferable frame is buffered based on the TIM element transmits the SP-poll frame to the AP (S2030).

The AP may transmit the buffered frame to the STA in the polled SP initiated by the transmission of the SP-poll frame (S2041 and S2042).

When the polled SP is terminated, the STA1 transmits an ACK frame to the AP (S2050) and enters a doze state (S2060).

Since the STA2 is positioned outside the service coverage of the AP, the STA2 may not receive the frame transmitted by the AP. On the other hand, since the STA2 is positioned in the coverage of the STA1, the STA2 may receive the frame transmitted by the STA1. The STA2 may overhear the SP-poll frame transmitted by the STA1 (S2071). Therefore, the STA2 may confirm the duration of the polled SP through the duration field of the SP-poll frame and may set an NAV for the duration (S2072). The NAV is set by the STA2 so that collision between the STA1 and the STA2 may be prevented.

Since the STA3 is positioned in the service coverage of the AP, the STA3 may receive the frame transmitted by the AP. On the other hand, the STA3 is positioned outside the coverage of the STA1, the STA3 may not receive the frame transmitted by the STA1. In this case, the STA3 may overhear the buffered frame transmitted by the AP (S2081 and S2082).

The STA3 may set an NAV based on duration information included in the preamble and/or the MAC header of the transmitted buffered frame (S2091 and S2092). Therefore, collision between the STA3 and the AP may be prevented.

When the SP-poll frame is applied to the frame transmission and reception of the STA that operates in the power save mode, the buffered frame may be transmitted at least one time in the polled SP. Therefore, traffic may be efficiently processed.

The above-described SP-poll frame may be applied to the frame transmitting and receiving method in the multi channel system.

Figure 21:
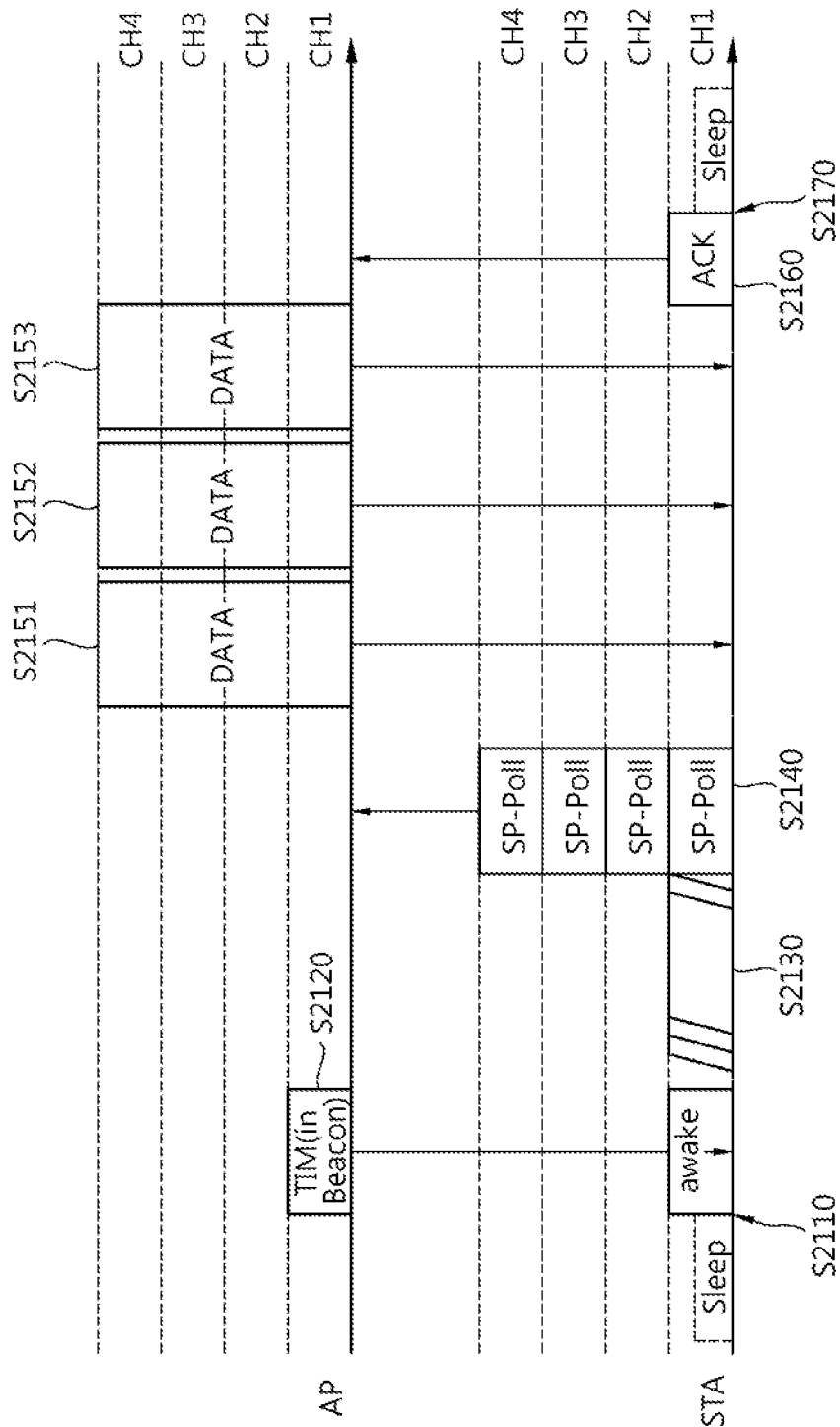
FIG. 21 shows a method for transmitting and receiving frames by an STA that operates in a power save mode according to still another embodiment of the present invention.

FIG. 21 shows a method for transmitting and receiving frames by an STA that operates in a power save mode according to still another embodiment of the present invention.

Referring to FIG. 21, an STA in a doze state enters an awake state in order to receive a TIM element (S2110).

The STA receives the TIM element (S2120). The TIM element may be included in a beacon frame to be transmitted. The TIM element may be included in a beacon frame to be transmitted. When the STA receives the TIM element, the STA may determine whether a bufferable frame therefor is buffered based on the bitmap sequence of a partial virtual bitmap field included in the TIM element and the AID of the STA.

The STA that confirms that the bufferable frame is buffered may transmit the SP-poll frame to request the AP to transmit the buffered frame. The polled SP may be initiated by the STA transmitting the SP-poll frame, on the other hand, according to the embodiment, since frame transmission and reception between the AP and the STA is performed by the multi channel WLAN system, in order for the STA to receive the buffered frame from the AP through the multi channel, it is necessary to transmit the SP-poll frame through the multi channel.

In order to transmit the SP poll frame through the multichannel, the STA that operates in the power save mode confirms whether the multi channel to be accessed is in an idle state (S2130). The STA that performs backoff in a primary channel confirms CCA for secondary channels after a backoff timer is expired and determines whether access to the multi channel may be performed. The SP-poll may be transmitted only to channels in the idle state that may be accessed.

The STA transmits the SP-poll frame to the AP through the multi channel (S2140). At this time, the SP-poll frame may be transmitted by a duplicate format. That the SP-poll is transmitted by the duplicate format means that unit SP-poll frames generated for unit bandwidths are transmitted through a plurality of adjacent channels. Referring to FIG. 21, it may be known that the unit SP-poll frames are transmitted through adjacent CH1 to CH4. When the unit bandwidth is 20 MHz bandwidth, it may mean that the 20 MHz SP-poll frames are transmitted through the CH1 to the CH4. The transmission of the SP-poll frame of the duplicate format is not limited to transmission through four adjacent channels. A detailed channel use example may follow the channel use example for transmitting the duplicate format described with reference to FIGS. 15 and 16.

Each of the unit SP-poll frames of the SP-poll frame transmitted by the duplicate format may be realized by an individual PPDU format. That is, the unit SP-poll frames may have the formats illustrated in FIG. 4 for a single receiver.

The SP-poll frame may include information on transmission bandwidth. The STA may configure a CH_BANDWIDTH_IN_NON_HT parameter of TXVECTOR that is a transmission parameter as a value of bandwidth in which the entire unit SP-poll frames are transmitted in generating the SP-poll frame. Information on the CH_BANDWIDTH_IN_NON_HT parameter may be included in a scrambling sequence used for processing data fields included in the unit SP-poll frames. The information may be included in initial 7 bits in the scrambling sequence. In addition, an address field including the MAC headers of each unit SP-poll frame may be configured by the above-described bandwidth signaling TA.

The value of the CH_BANDWIDTH parameter of the TXVECTOR parameter used when the STA that desires to transmit the SP-poll frame generates the SP-poll frame may be configured in the BW field of the VHT-SIG-A field of the unit SP-poll frame. When the TA field of the unit SP-poll is configured as the bandwidth signaling TA, the value of the CH_BANDWIDTH parameter may be configured to the as the value of CH_BANDWIDTH_IN_NON_HT.

That is, first bandwidth information indicating the entire bandwidth in which the SP-poll frame is transmitted may be included in the signal fields (the VHT-SIG-A fields) of the unit SP-poll frames included in the SP-poll frame transmitted by the STA and transmitted over the channels. In addition, the data fields of the unit SP-poll frames may be scrambled based on the scrambling sequence including second bandwidth information indicating the entire bandwidth.

Referring back to FIG. 21, the AP that receives the SP-poll frame from the STAs transmits the buffered frames to the STA for the polled SP initiated by the SP-polled frame (S2151, S2152, and S2153). In transmitting the buffered frames to the STAs, the AP may transmit the buffered frames through bandwidth equal to or smaller than the bandwidth in the SP-poll frame is transmitted. For example, the AP may receive at least one unit SP-poll frame among the SP-poll frame of the duplicate format. In this case, the AP may transmit the buffered frames only through the channels that normally receive the at least one unit SP-poll frame. For another example, although the AP receives at least one unit SP-poll frames among the SP-poll frame of the duplicate format, the buffered frames may be transmitted using the entire bandwidth in which the SP-poll frame of the duplicate format are transmitted. On the other hand, the channel determined not to be in the idle state through the CCA immediately before the AP receives the SP-poll frame may not be used for transmitting the buffered frame.

In transmitting the buffered frames a plurality of number of times in the polled SP, transmission bandwidth for a later transmitted buffered frame may be equal to or smaller than transmission bandwidth for a previously transmitted buffered frame.

The STAs receive the buffered frames from the AP and transmits an ACK frame to the AP (S2160). The ACK frame may be transmitted only through a primary channel. The ACK frame may be transmitted through the channels where the SP-poll frame is transmitted. The ACK frame may be transmitted through the channels where the buffered frame is transmitted.

The STAs may enter the doze state after transmitting the ACK frame (S2170).

According to the above-described frame transmitting and receiving method, in the multi channel WLAN system, the STAs may transmit the SP-poll frame of the duplicate format to request to transmit the buffered frames and the polled SP for the transmission of the buffered frames no less than one time may be initiated. In addition, the bandwidth in which the AP transmits the buffered frames may be signaled by the transmission of the duplicate format. Therefore, the AP may transmit the at least one buffered frame to the STA based on the bandwidth signaled in the polled SP initiated by the SP-poll frame.

Figure 22:
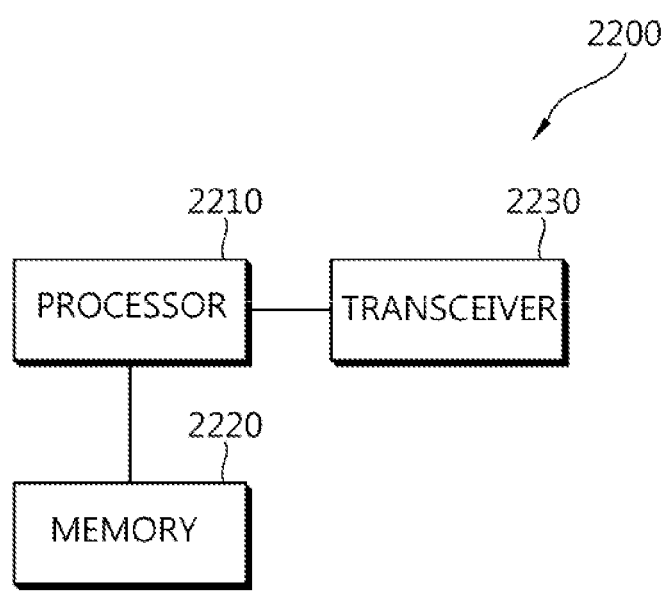
FIG. 22 is a block diagram illustrating a wireless device by which an embodiment of the present invention may be realized.

FIG. 22 is a block diagram illustrating a wireless device by which an embodiment of the present invention may be realized.

Referring to FIG. 22, a wireless device 2200 includes a processor 2210, a memory 2220, and a transceiver 2230. The transceiver 2230 transmits and/or receives a wireless signal and realizes a physical layer of IEEE 802.11. The processor 2210 may be configured to be operably connected to the transceiver 2230 to transmit and receive a TIM element and to determine whether the bufferable frame therefor is buffered. The processor 2210 may be configured to transmit the PS-poll frame of the duplicate format or the SP poll frame. The processor 2210 may be configured to transmit and receive the buffered frame. The processor 2110 may be configured to change a doze state and/or an awake state in accordance with the transmission and reception of the TIM element and the buffered frame. The processor 2210 may be configured to realize the above-described embodiment of the present invention with reference to FIGS. 15 to 21.

The processor 2210 and/or the transceiver 2230 may include an application-specific integrated circuit (ASIC), different chip sets, a logic circuit, and/or a data processing apparatus. When the embodiment is realized by software, the above-described method may be realized by a module (a procedure, a function, etc.) for performing the above-described function. The module is stored in the memory 2220 and may be executed by the processor 2210. The memory 2220 may be included in the processor 2210 and may be positioned outside to be functionally connected to the processor 2210 by various well-known means.

In the above-described exemplary system, the methods are described based on the flowcharts as a series of steps or blocks. However, the present invention is not limited to the order of the steps. A certain step may be generated in a different order from the above-described other steps or may be simultaneously generated with the other steps. In addition, those who skilled in the art may understand that the steps in the flowcharts are not exclusive but other steps may be included or at least one step may be deleted without affecting the scope of the present invention.

What is claimed is:

1. A method for a wireless area network, the method performed by an access point (AP) comprising:
   transmitting a beacon frame to a station operating in a power save mode, the beacon frame including a Traffic Indication Map (TIM) element indicating that the AP has a buffered frame for the station;
   receiving, from the station, a power save (PS) poll frame and at least one duplicated PS poll frame to request the AP to transmit the buffered frame on a first 20 MHz channel and at least one second 20 MHz channel, the least one duplicated PS poll frame being received on the at least one second 20 MHz channel; and
   transmitting the buffered frame to the station as a response to at least one of the PS poll frame and the at least one duplicated PS poll frame,
   wherein the PS poll frame and the at least one duplicated PS poll frame respectively comprise a data field that is scrambled based on a scrambling sequence that represents an entire bandwidth in which all of the PS poll frame and the at least one duplicated PS poll frame are transmitted.

2. The method of claim 1, wherein a number of the at least one second 20 MHz channel is one and the first 20 MHz channel is contiguous with the second 20 MHz channel.

3. The method of claim 1, wherein a number of the at least one second 20 MHz channel is three.

4. method of claim 1, wherein number of the at least one second 20 MHz channel is seven.

5. The method of claim 1, wherein the data field includes a transmitter address field set to a value which indicates that the scrambling sequence relates to the entire bandwidth which all of the PS poll frame and the at least one duplicated PS poll frame are transmitted.

6. A device for a wireless local area network, the device comprising:
- a transceiver configured to transmit and receive radio signals; and
- a processor operatively coupled with the transceiver and configured to:
  - instruct the transceiver to transmit a beacon frame to a station operating in a power save mode, the beacon frame including a Traffic Indication Map (TIM) element indicating that the device has a buffered frame for the station,
  - instruct the transceiver to receive, from the station, a power save (PS) poll frame and at least one duplicated PS poll frame to request the device to transmit the buffered frame on a first 20 MHz channel and at least one second 20 MHz channel, the at least one duplicated PS poll frame being received on the at least one second 20 MHz channel, and
  - instruct the transceiver to transmit the buffered frame to the station as a response to at least one of the PS poll frame and the at least one duplicated PS poll frame,
  wherein the PS poll frame and the at least one duplicated PS poll frame respectively comprise a data field that is scrambled based on a scrambling sequence that represents an entire bandwidth in which all of the PS poll frame and the at least one duplicated PS poll frame are transmitted.

7. The device of claim 6, wherein a number of the at least one second 20 MHz channel is one, and the first 20 MHz channel is contiguous with the second 20 MHz channel.

8. The device of claim 6, wherein a number of the at least one second 20 MHz channel is three.

9. The device of claim 6, wherein a number of the at least one second 20 MHz channel is seven.

10. The device of claim 6, wherein the data field includes a transmitter address field set to a value which indicates that the scrambling sequence relates to the entire bandwidth in which all of the PS poll frame and the at least one duplicated PS poll frame are transmitted.

* * * * *